United States Patent
Tanba et al.

(10) Patent No.: US 8,210,985 B2
(45) Date of Patent: Jul. 3, 2012

(54) VEHICULAR POWER TRANSMISSION CONTROL APPARATUS

(75) Inventors: Toshio Tanba, Kariya (JP); Kan Sasaki, Nagoya (JP); Takeshige Miyazaki, Chiryu (JP); Yousuke Hayashi, Toyota (JP)

(73) Assignee: Aisin AI Co., Ltd., Nishio-Shi (JP)

( * ) Notice: Subject to any disclaimer, the term of this patent is extended or adjusted under 35 U.S.C. 154(b) by 304 days.

(21) Appl. No.: 12/720,940

(22) Filed: Mar. 10, 2010

(65) Prior Publication Data

US 2010/0234171 A1    Sep. 16, 2010

(30) Foreign Application Priority Data

Mar. 11, 2009    (JP) ................................. 2009-057465

(51) Int. Cl.
*B60W 10/02* (2006.01)
*B60W 10/08* (2006.01)
(52) U.S. Cl. .............................................. 477/3; 477/5
(58) Field of Classification Search .................. 477/3, 5, 477/80, 120
See application file for complete search history.

(56) References Cited

U.S. PATENT DOCUMENTS

| | | | | |
|---|---|---|---|---|
| 2007/0259755 A1* | 11/2007 | Tanishima | ........................ | 477/3 |
| 2008/0004156 A1* | 1/2008 | Tabata et al. | ...................... | 477/3 |
| 2010/0180722 A1* | 7/2010 | Sasaki | ......................... | 74/665 F |

FOREIGN PATENT DOCUMENTS

JP    2000-224710 A1    8/2000

OTHER PUBLICATIONS

U.S. Appl. No. 12/720,956, filed Mar. 10, 2010, Miyazaki et al.
U.S. Appl. No. 12/720,964, filed Mar. 10, 2010, Miyazaki et al.
U.S. Appl. No. 12/720,979, filed Mar. 10, 2010, Miyazaki et al.
U.S. Appl. No. 12/720,984, filed Mar. 10, 2010, Miyazaki et al.
U.S. Appl. No. 12/754,931, filed Apr. 6, 2010, Tanba et al.
U.S. Appl. No. 12/754,946, filed Apr. 6, 2010, Hatori et al.

* cited by examiner

*Primary Examiner* — Edwin A Young
(74) *Attorney, Agent, or Firm* — Burr & Brown

(57) ABSTRACT

An apparatus comprises a changeover mechanism which is able to change a connection state of an electric motor output shaft to any one of states including, "an IN-Connection State" in which a power transmission path is provided between a transmission input shaft and the electric motor output shaft, "an OUT-Connection State" in which a power transmission path is provided between the transmission output shaft and the electric motor output shaft, and "a neutral state" in which no transmission path therebetween is provided. The changeover is carried out based on a combination of a vehicle speed V and a required driving torque T. When the vehicle starts to drive, "the IN-Connection State" is selected. After the start of the vehicle and while the vehicle speed V is increasing, the changeovers to "the OUT-Connection State", "the IN-Connection State", and "the neutral state" are sequentially carried out.

7 Claims, 24 Drawing Sheets

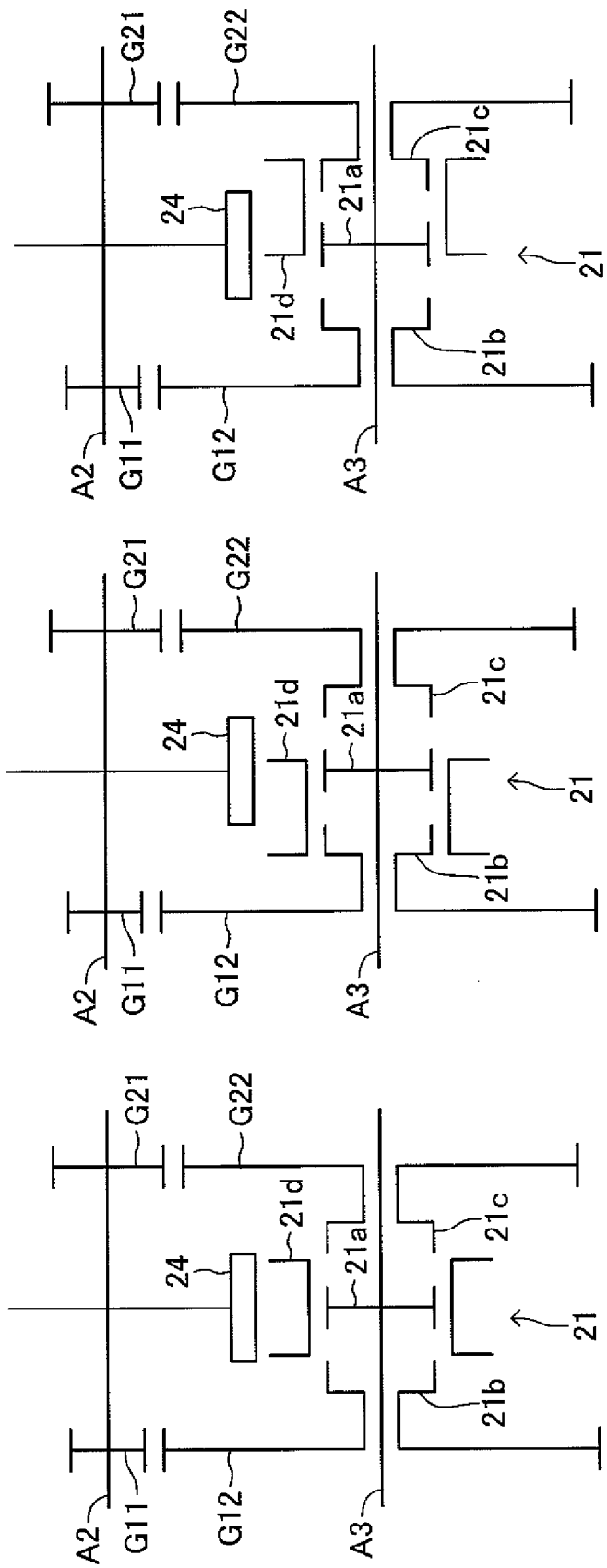

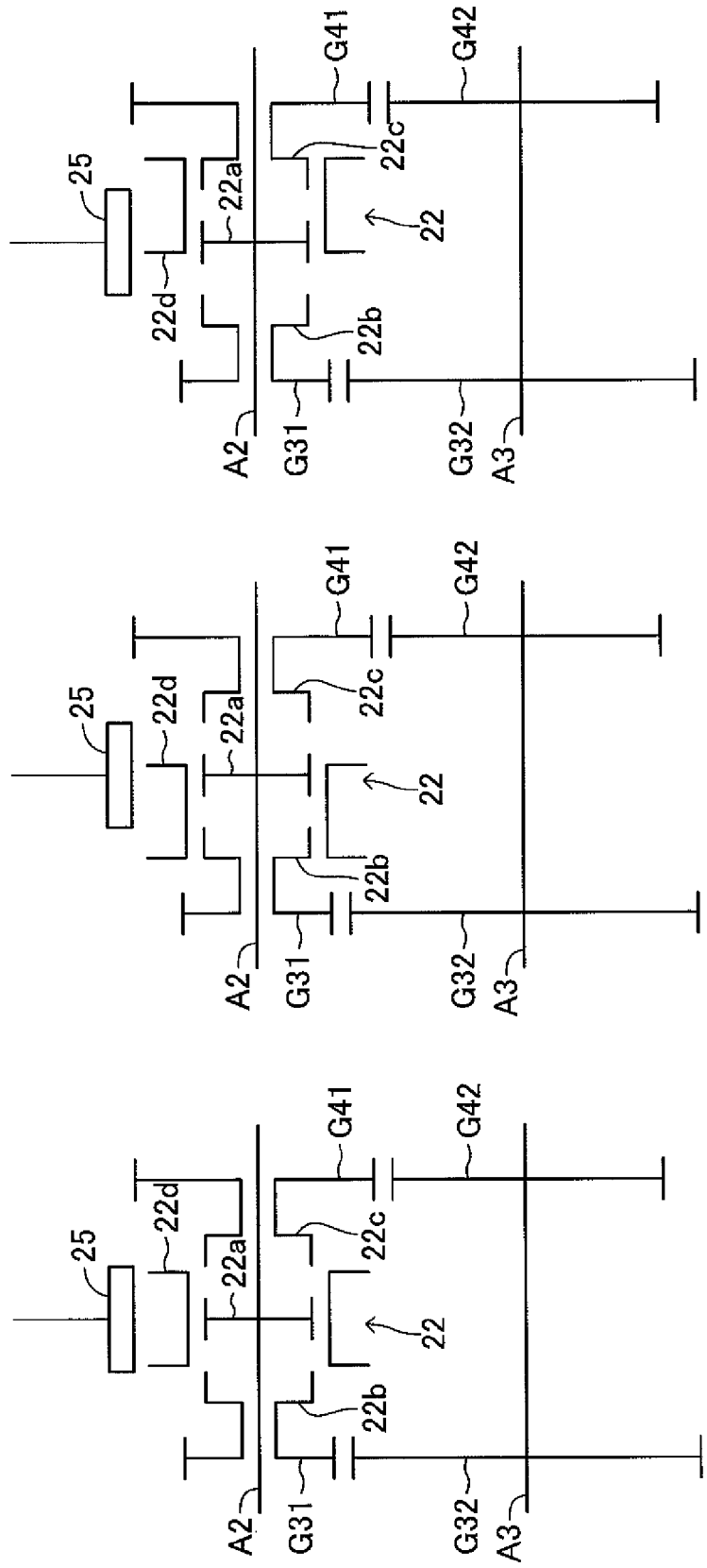

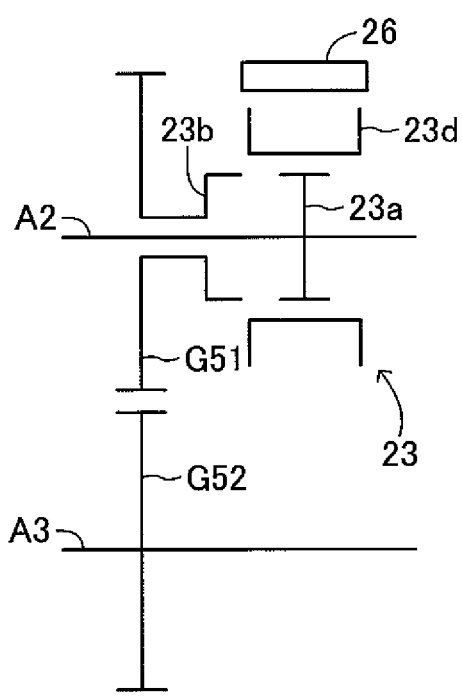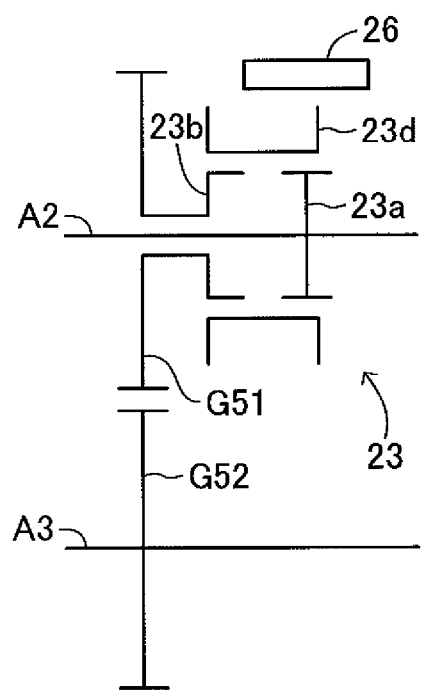
FIG.4A — non-connection (neutral)
FIG.4B — 5th gear position connection

VEHICULAR POWER TRANSMISSION CONTROL APPARATUS

BACKGROUND OF THE INVENTION

1. Field of the Invention

The present invention relates to a vehicular power transmission control apparatus, especially to a vehicular power transmission control apparatus applied to a vehicle comprising an internal combustion engine and an electric motor as power sources.

2. Description of the Related Art

In these days, a so-called hybrid vehicle comprising an internal combustion engine and an electric motor (electric motor generator) as power sources has been developed (refer to, for example, Japanese Unexamined Patent Application Publication No. 2000-224710). In the hybrid vehicle, the electric motor is used as the power source generating a driving torque for driving the vehicle together with the internal combustion engine or by itself, or is used as a power source for starting the internal combustion engine.

Further, the electric motor is used as an electric motor generator for generating a regeneration torque to provide a breaking force to the vehicle, or is used as an electric motor generator for generating an electric power which is supplied to and stored in a battery of the vehicle. These usages of the electric motor can improve a total energy efficiency (fuel consumption) of the vehicle as a whole.

SUMMARY OF THE INVENTION

In the meanwhile, in the hybrid vehicle, there is a case where a connection state (hereinafter, referred to as an "IN-Connection State") is used in which a power transmission path between an output shaft of the electric motor and an input shaft of a transmission is provided, and there is another case where another connection state (hereinafter, referred to as an "OUT-Connection State") is used in which a power transmission path between the output shaft of the electric motor and an output shaft of the transmission (and thus, driving wheels) is provided without involving the transmission.

In the "IN-Connection State", a rotational speed of the output shaft of the electric motor with respect to a vehicle speed can be varied by changing a gear position of the transmission. Accordingly, adjusting the gear position of the transmission can provide an advantage such that the rotational speed of the output shaft of the electric motor can easily be maintained within a range in which an energy conversion efficiency (more specifically, an efficiency in generating the driving torque, the regeneration torque, or the like) is high.

On the other hand, the "OUT-Connection State" provides an advantage such that a power transfer loss can be made smaller, since the power transmission path does not involve the transmission having a complicated mechanism. In addition, in the transmission (especially, in a transmission of a type which does not include a torque converter), a power transmission path from the input shaft of the transmission to the output shaft of the transmission is generally shut off temporarily during a gear position shifting operation (during an operation in which the gear position is changed). Consequently, a rapid change in an acceleration in a front-rear direction of the vehicle (so-called shift shock) tends to occur. However, the "OUT-Connection State" allows the driving torque from the electric motor to be continuously transmitted to the output shaft of the transmission (and therefore to the drive wheels) even during the gear position shifting operation, and therefore provides an advantage such that the shift shock is suppressed.

In view of the above, the assignee of the present invention has already proposed a changeover mechanism which can change/switch a connection state of the output shaft of the electric motor between the IN-Connection State and the OUT-Connection State, in Japanese Patent Application No. 2007-271556. However, no suggestion as to how to select one of the IN-Connection State and the OUT-Connection State has been made.

An object of the present invention is therefore to provide a vehicular power transmission control apparatus applied to a vehicle comprising an internal combustion engine and an electric motor as power sources, the control apparatus being able to select an appropriate connection state from the IN-Connection State and the OUT-Connection State.

The vehicular power transmission control apparatus according to the present invention comprises a transmission, a changeover mechanism, and control means. Each of them will be described hereinafter.

The transmission comprises: an input shaft to provide/realize a power transmission path between the input shaft of the transmission and an output shaft of the internal combustion engine; and an output shaft to realize a power transmission path between the output shaft of the transmission and drive wheels of the vehicle. The transmission is configured so as to be able to adjust a ratio (transmission reduction ratio) of a rotational speed of the input shaft of the transmission to a rotational speed of the output shaft of the transmission. It should be noted that the transmission may be a multiple gear ratio transmission which can realize each of a plurality of predetermined reduction ratios different from one another as the transmission reduction ratio, or may be a continuously variable transmission which can continuously (in a non-stepwise fashion) adjust a reduction ratio as the transmission reduction ratio.

Further, the transmission may be "a multiple gear ratio transmission or a continuously variable transmission (so-called automatic transmission (AT))" comprising a torque converter and being configured in such a manner that the gear position shifting operation is automatically performed in accordance with a vehicle driving condition, or may be "a multiple gear ratio transmission without the torque converter (so-called manual transmission (MT)). If the transmission is the manual transmission, the transmission may be but not limited to any one of the following types.

A type in which the gear position shifting operation is performed directly by a force applied to a shift lever from a driver.

A type in which the gear position shifting operation is performed by a drive force generated by an actuator which is driven in response to a signal indicative of a position of a shift lever which the driver operates.

A type in which the gear position shifting operation can be automatically performed by a drive force generated by an actuator which is automatically driven in accordance with the vehicle driving condition, without depending on an operation to the shift lever by the driver (i.e., a so-called automated manual transmission)

The changeover mechanism can change a connection state of the output shaft of the electric motor from "an input-side-connection state (the IN-Connection State) in which a power transmission path is provided/realized between the output shaft of the electric motor and the input shaft of the transmission" to "an output-side-connection state (the OUT-Connection State) in which a power transmission path is provided/ realized between the output shaft of the electric motor and the drive wheels", or vice versa. The changeover mechanism may be configured in such a manner that the changeover mechanism can set the connection state of the output shaft of the electric motor to a state (non-connection state) in which no power transmission path is provided/realized not only between the output shaft of the electric motor and the input shaft of the transmission but also between the output shaft of the electric motor and the drive wheels.

In the IN-Connection State, a ratio (hereinafter referred to as a "first reduction ratio") of the rotational speed of the output shaft of the electric motor to the rotational speed of the input shaft of the transmission is generally fixed to a constant (e.g., 1). Hereinafter, a product of "the first reduction ratio" and "the transmission reduction ratio" is referred to as an "IN-connection reduction ratio". "The IN-connection reduction ratio" varies in accordance with a change in "the transmission reduction ratio" caused by the gear position shifting operation of the transmission. On the other hand, in the OUT-Connection State, a ratio of the rotational speed of the output shaft of the electric motor to a rotational speed of the output shaft of the transmission is generally fixed to a constant (e.g., a value larger than 1, a value close to the transmission reduction ratio corresponding to a 2nd gear position, or the like). Hereinafter, this ratio is referred to as a "OUT-connection reduction ratio" "The OUT-connection reduction ratio" is kept constant, even when "the transmission reduction ratio" varies. It should be noted that a ratio of the rotational speed of the output shaft of the internal combustion engine to a rotational speed of the input shaft of the transmission is generally set at a constant (e.g., 1).

By the control means, the connection state (an target connection state) of the output shaft of the electric motor is selected/determined based on a parameter correlating with the vehicle speed and a parameter correlating with a required driving torque obtained based on an operation applied to an acceleration operating member by the driver of the vehicle, and the changeover mechanism is controlled in such a manner that an actual connection state of the output shaft of the electric motor coincides with the selected/determined connection state.

Here, as the parameter correlating with the vehicle speed, any one of the vehicle speed itself, the rotational speed of the input shaft of the transmission, the rotational speed of the output shaft of the internal combustion engine, and the rotational speed of the output shaft of the electric motor may be used. As the parameter correlating with the required driving torque, either one of an operating amount of the acceleration operating member and an opening degree of a throttle valve disposed in an intake passage of the internal combustion engine may be used.

According to the configuration described above, the (target) connection state of the output shaft of the electric motor is selected based on a combination of the vehicle speed and the required driving torque. Accordingly, one of the IN-Connection State and the OUT-Connection State (and/or the neutral state) can be appropriately selected as the (target) connection state of the output shaft of the electric motor, for the vehicle driving condition.

More specifically, for example, the control means may be configured in such a manner that the control means, selects the IN-Connection State (hereinafter, referred to as a "first-IN-Connection State") when the vehicle starts to drive, changes the connection state of the output shaft of the electric motor from the (first) IN-Connection State to the OUT-Connection State when the vehicle speed passes through/over a first threshold (a low speed area) while the vehicle speed is increasing under a condition in which the OUT-connection reduction ratio is smaller than the IN-connection reduction ratio, and changes the connection state of the output shaft of the electric motor from the OUT-Connection State to the IN-Connection State (hereinafter, referred to as a "second IN-Connection State") when the vehicle speed passes through/over a second threshold (a middle speed area) larger than the first threshold while the vehicle speed is increasing under a condition in which the IN-connection reduction ratio is smaller than the OUT-connection reduction ratio.

It should be noted that each of the first and second thresholds may be a value varying depending on the required driving torque, or be a constant value.

According to the configuration above, the IN-Connection State (the first-IN-Connection State) is selected when the vehicle starts to drive. Generally, when the vehicle starts to drive, the transmission reduction ratio is set at a relatively large value, and the IN-connection reduction ratio is therefore larger than the OUT-connection reduction ratio. Accordingly, a driving torque, which is transmitted to the drive wheels and which is based on an output of the electric motor, can be made larger, compared to a case where the OUT-Connection State is selected. Consequently, a large driving torque can be generated at the drive wheels when the vehicle starts to drive.

In addition, the connection state of the output shaft of the electric motor is changed from the (first) IN-Connection State to the OUT-Connection State, when the vehicle speed which increases after the start of the vehicle passes through/over the first threshold (the low speed area). Accordingly, the shift shock described above can be suppressed, when the gear position shifting operation is performed after the changeover from the (first) IN-Connection State to the OUT-Connection State is completed. Especially, a severe shift shock tends to occur when the gear position is changed from the 1st gear position (low position) to a 2nd gear position (second position), since a change amount in the reduction ratio is large. In view of the above, it is preferable that the first threshold be set at a value smaller (or slightly smaller) than a vehicle speed at which the gear position is changed from the 1st gear position to the 2nd gear position.

Further, the changeover from the (first) IN-Connection State to the OUT-Connection State is carried out in the condition in which the OUT-connection reduction ratio is smaller than the IN-connection reduction ratio. Accordingly, the changeover decreases the rotational speed of the output shaft of the electric motor. Generally, a maximum torque which the electric motor can generate is larger as the rotational speed of the output shaft of the electric motor is smaller. Therefore, the changeover described above can also provide an effect that the maximum torque which the electric motor can generate is increased.

While the vehicle speed is increasing in the OUT-Connection State, the gear position of the transmission is shifted toward a higher gear position. That is, the transmission reduction ratio is changed to a smaller ratio, and the IN-connection reduction ratio is thereby changed to a smaller ratio. In the meantime, as described above, the OUT-connection reduction ratio is kept constant. Consequently, a magnitude relation between the OUT-connection reduction ratio and the IN-connection reduction ratio is reversed, and the IN-connection reduction ratio can become smaller than the OUT-connection reduction ratio. Further, the rotational speed of the output shaft of the electric motor under the OUT-Connection State increases depending on the OUT-connection reduction ratio, as the vehicle speed increases. Accordingly, as just described above, when the vehicle speed, which is increasing, passes through/over the second threshold (the middle speed area) under the condition where the IN-connection reduction ratio is smaller than the OUT-connection reduction ratio and the rotational speed of the output shaft of the electric motor is sufficiently large, the connection state of the output shaft of the electric motor is changed from the OUT-Connection State to the (2nd) IN-Connection State. Accordingly, this changeover decreases the rotational speed of the output shaft of the electric motor. Generally, the electric motor has a characteristic that it can operate only within a range in which the rotational speed is lower than a certain value (hereinafter, referred to as an "allowable rotational speed"). In view of the above, it is preferable that the second threshold be set at a vehicle speed which corresponds to a vehicle speed when the rotational speed of the output shaft of the electric motor in the OUT-Connection State coincides with a value (e.g. a value slightly smaller than the allowable rotational speed) determined based on the allowable rotational speed.

As described above, in the apparatus in which the connection state of the output shaft of the electric motor is shifted from the (first) IN-Connection State→the OUT-Connection State→the (second) IN-Connection State with the increase of the vehicle speed, it is preferable that the control means be configured in such a manner that, it changes the (actual) connection state of the output shaft of the electric motor from the (second) IN-Connection State to the OUT-Connection State, when the vehicle speed passes over a value smaller than the second threshold by a first deviation (and the value being larger than the first threshold) while the vehicle speed is decreasing in a condition in which the IN-connection reduction ratio is smaller than the OUT-connection reduction ratio, and it changes the (actual) connection state of the output shaft of the electric motor from the OUT-Connection State to the (first) IN-Connection State, when the vehicle speed passes over a value smaller than the first threshold by a second deviation while the vehicle speed is decreasing in a condition in which the OUT-connection reduction ratio is smaller than the IN-connection reduction ratio.

According to the above configuration, the difference (=the second deviation) is provided between the vehicle speed (=the first threshold) at which the changeover from the (first) IN-Connection State to the OUT-Connection State is carried out and the vehicle speed (=the first threshold—the second deviation) at which the changeover from the OUT-Connection State to the (first) IN-Connection State. Accordingly, in a case in which the vehicle speed frequently increases and decreases or vice versa around the first threshold, an occurrence of a situation (so-called hunting) can be suppressed in which the changeover from the (first) IN-Connection State to the OUT-Connection State and the changeover from the OUT-Connection State to the (first) IN-Connection State are unnecessarily carried out. Similarly, the difference (=the first deviation) is provided between the vehicle speed (=the second threshold) at which the changeover from the OUT-Connection State to the (second) IN-Connection State is carried out and the vehicle speed (=the second threshold—the first deviation) at which the changeover from the (second) IN-Connection State to the OUT-Connection State. Accordingly, in a case in which the vehicle speed frequently increases and decreases or vice versa around the second threshold, an occurrence of a situation (so-called hunting) can be suppressed in which the changeover from the OUT-Connection State to the (second) IN-Connection State and the changeover from the (second) IN-Connection State to the OUT-Connection State are unnecessarily carried out.

Further, in the vehicular power transmission control apparatus according to the present invention wherein the changeover mechanism is configured so as to be able to select the non-connection state, it is preferable that the apparatus (the control means) be configured so as to change said (actual) connection state of the output shaft of the electric motor from the (second) IN-Connection state to the non-connection state, when the vehicle speed passes over a third threshold (high speed area) larger than the second threshold while said vehicle speed is increasing in a condition in which the IN-Connection reduction ratio is smaller than the OUT-Connection reduction ratio.

The rotational speed of the output shaft of the electric motor which is in the IN-Connection State increases depending on the IN-connection reduction ratio, as the vehicle speed further increases under the (second) IN-Connection State (and as the gear position of the transmission is shifted to a higher gear position). Generally, the energy conversion efficiency of the electric motor varies in accordance with the rotational speed (of the electric motor). The energy conversion efficiency of the electric motor reaches the maximum efficiency when the rotational speed reaches a certain speed, and becomes smaller as the rotational speed comes closer to the allowable rotational speed from the certain speed. In the meantime, it is highly likely that an energy generation efficiency of the internal combustion engine is high in such a high speed region in which the energy conversion efficiency of the electric motor is low. In view of the above, it is considered that, under the (second) IN-Connection State, having only the internal combustion engine generate the driving torque corresponding to the required driving torque while stopping using the electric motor is preferable in order to improve the total energy efficiency (fuel consumption) of the vehicle as a whole, when the energy conversion efficiency becomes low due to the high rotational speed of the electric motor.

The configuration described above is based on the finding described above. Accordingly, it is preferable that the third threshold be a vehicle speed when the energy conversion efficiency coincides with a predetermined value. The third threshold may be a value varying depending on the required driving torque, or be a constant value.

As described above, in the apparatus in which the connection state of the output shaft of the electric motor is shifted from the (second) IN-Connection State to the non-connection state with the increase of the vehicle speed, it is preferable that the control means be configured so as to change the (actual) connection state of the output shaft of the electric motor from the non-connection state to the (second) IN-Connection State, when the vehicle speed passes over a value smaller than the third threshold by a third deviation (and the value being larger than the second threshold) while the vehicle speed is decreasing in a condition in which the IN-connection reduction ratio is smaller than the OUT-connection reduction ratio.

According to the above configuration, the difference (=the third deviation) is provided between the vehicle speed (=the third threshold) at which the changeover from the (second) IN-Connection State to the non-connection state is carried out and the vehicle speed (=the third threshold—the third deviation) at which the changeover from the non-connection state to the (second) IN-Connection State. Accordingly, in a case in which the vehicle speed frequently increases and decreases or vice versa around the third threshold, an occurrence of a situation (so-called hunting) can be suppressed in which the changeover from the (second) IN-Connection State to the non-connection state and the changeover from the non-connection state to the (second) IN-Connection State are unnecessarily carried out.

It is preferable that the vehicular power transmission control apparatus according to the present invention be applied to the automated manual transmission. In this case, a clutch mechanism is provided between the output shaft of the internal combustion engine and the input shaft of the transmission. The clutch mechanism can shut or provide the power transmission path between the output shaft of the internal combustion engine and the input shaft of the transmission. In addition, in this case, the transmission does not comprise the torque converter, but is the multiple gear ratio transmission which can realize any one of predetermined multiple reduction ratios different from one another as the transmission reduction ratio. Further, the control means is configured so as to control shutting and providing of the power transmission path by the clutch mechanism and so as to the transmission reduction ratio (the gear position) based on the driving condition (e.g., the vehicle speed and the required torque) of the vehicle.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 2A is a schematic view showing one of three states which the first changeover mechanism in the transmission shown in FIG. 1 can realize;

FIG. 2B is a schematic view showing one of three states which the first changeover mechanism in the transmission shown in FIG. 1 can realize;

FIG. 2C is a schematic view showing one of three states which the first changeover mechanism in the transmission shown in FIG. 1 can realize;

FIG. 3A is a schematic view showing one of three states which the second changeover mechanism in the transmission shown in FIG. 1 can realize;

FIG. 3B is a schematic view showing one of three states which the second changeover mechanism in the transmission shown in FIG. 1 can realize;

FIG. 3C is a schematic view showing one of three states which the second changeover mechanism in the transmission shown in FIG. 1 can realize;

FIG. 4A is a schematic view showing one of two states which the third changeover mechanism in the transmission shown in FIG. 1 can realize;

FIG. 4B is a schematic view showing one of two states which the third changeover mechanism in the transmission shown in FIG. 1 can realize;

DESCRIPTION OF THE PREFERRED EMBODIMENTS

Next will be described embodiments of a vehicular power transmission control apparatus according to the present invention with reference to the drawings.

(Configuration)

Figure 1:
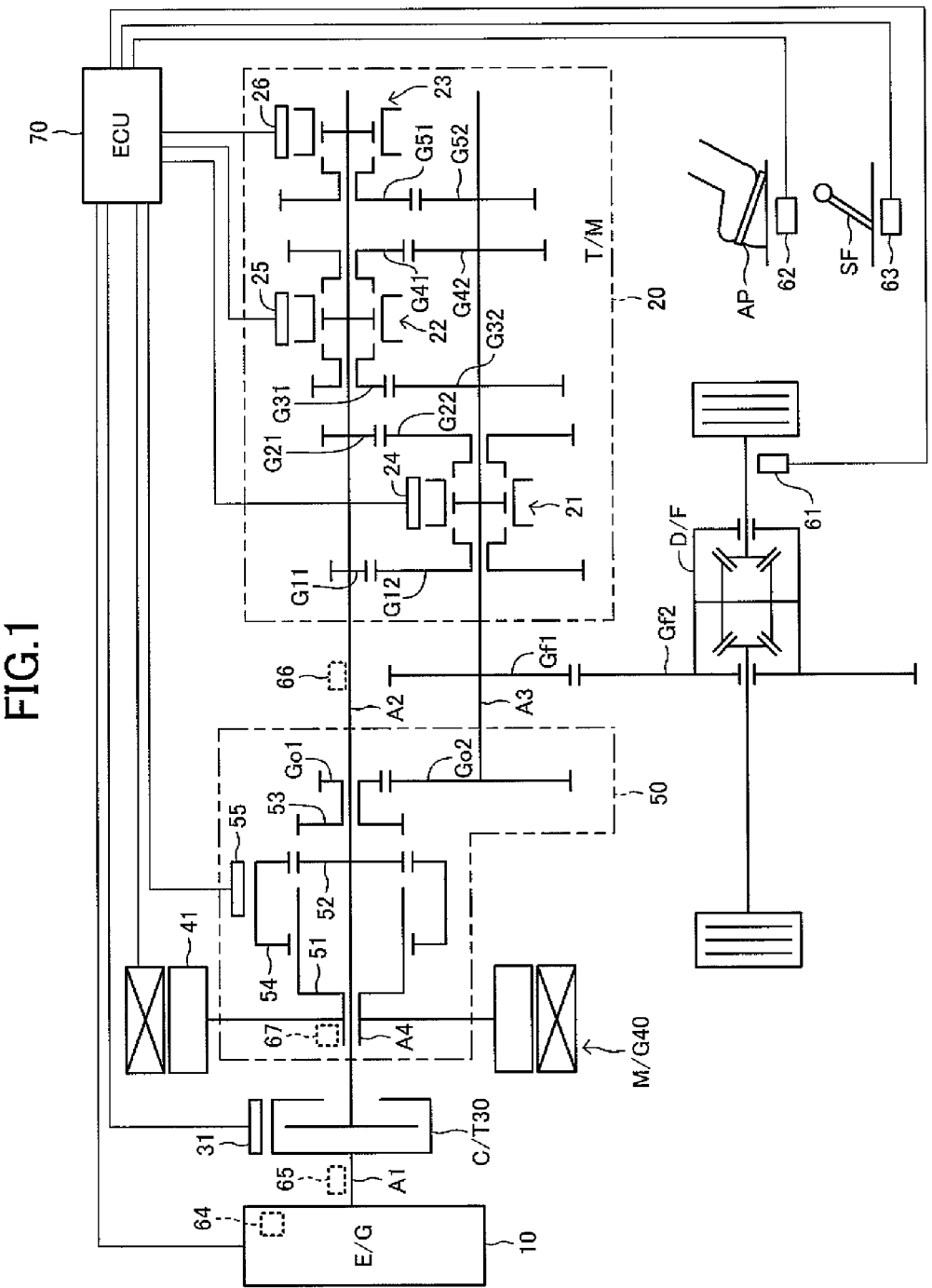
FIG. 1 is a schematic view of a vehicle which mounts a vehicular power transmission control apparatus according to an embodiment of the present invention.

FIG. 1 shows a schematic configuration of a vehicle mounting a vehicular power transmission control apparatus (hereinafter, referred to as a "present apparatus") according to an embodiment of the present invention. The present apparatus is applied to the vehicle comprising, as its power sources, an internal combustion engine and a motor generator. The vehicle comprises a so-called automated manual transmission, which uses a multiple gear ratio transmission, but which does not have a torque converter.

The vehicle comprises the engine (E/G) 10, the transmission (T/M) 20, a clutch (C/T) 30, the motor generator (M/G) 40, and a changeover mechanism 50. The E/G 10 is one of well-known internal combustion engines, including a gasoline engine which uses a gasoline as a fuel and a diesel engine which uses a light diesel oil as a fuel. An output shaft A1 of the E/G 10 is connected to an input shaft A2 of the T/M 20 through the C/T 30.

The T/M 20 is one of well-known multiple gear ratio transmission. The T/M 20 has five gear positions (a 1st, a 2nd, a 3rd, a 4th, and a 5th positions) as forward gear positions. The T/M 20 does not comprise a torque convertor. That is, the T/M 20 can set a transmission reduction ratio Gtm at one of five ratios. The transmission reduction ratio Gtm is a ratio of a rotational speed of the input shaft A2 to a rotational speed of the output shaft A3. The gear positions are changed/shifted by controlling a first, a second, and a third changeover mechanisms 21, 22, and 23.

More specifically, as shown in FIG. 2, the first changeover mechanism 21 comprises a gear G11 axially supported by and rotatably immovable relative to the input shaft A2, a gear G12 axially supported by and rotatably movable relative to the output shaft A3 so as to always mesh with the gear G11, a gear G21 axially supported by and rotatably immovable relative to the input shaft A2, and a gear G22 axially supported by and rotatably movable relative to the output shaft A3 so as to always mesh with the gear G21. Further, the first changeover mechanism 21 comprises a connection piece 21a which rotates integrally with the output shaft A3, a connection piece 21b which rotates integrally with the gear G12, a connection piece 21c which rotates integrally with the gear G22, a sleeve 21d, and an actuator 24.

The sleeve 21d is provided so as to be movable in an axial direction of the output shaft A3. A position of the sleeve 21d along the axial direction is controlled by the actuator 24. The sleeve 21d is able to be spline-engaged with the connection pieces 21a, 21b, and 21c. When the sleeve 21d is at a non-connection position (neutral position) shown in FIG. 2A, the sleeve 21d spline-engages only with the connection piece 21a, and both of the gears G12 and G22 are therefore rotatably movable relative to the output shaft A3. When the sleeve 21d is at a 1st-gear-position-connection position shown in FIG. 2B, the sleeve 21d spline-engages with the connection pieces 21a and 21b. Accordingly, the gear G12 is rotatably immovable relative to the output shaft A3, whereas the gear G22 is rotatably movable relative to the output shaft A3. When the sleeve 21d is at a 2nd-gear-position-connection position shown in FIG. 2C, the sleeve 21d spline-engages with the connection pieces 21a and 21c. Accordingly, the gear G22 is rotatably immovable relative to the output shaft A3, whereas the gear G12 is rotatably movable relative to the output shaft A3.

As shown in FIGS. 3A to 3C, the second changeover mechanism 22 comprises a gear G31 axially supported by and rotatably movable relative to the input shaft A2, a gear G32 axially supported by and rotatably immovable relative to the output shaft A3 so as to always mesh with the gear G31, a gear G41 axially supported by and rotatably movable relative to the input shaft A2, and a gear G42 axially supported by and rotatably immovable relative to the output shaft A3 so as to always mesh with the gear G41. Further, the second changeover mechanism 22 comprises a connection piece 22a which rotates integrally with the input shaft A2, a connection piece 22b which rotates integrally with the gear G31, a connection piece 22c which rotates integrally with the gear G41, a sleeve 22d, and an actuator 25.

The sleeve 22d is provided so as to be movable in an axial direction of the input shaft A2. A position of the sleeve 22d along the axial direction is controlled by the actuator 25. The sleeve 22d is able to spline-engage with the connection pieces 22a, 22b, and 22c. When the sleeve 22d is at a non-connection position (neutral position) shown in FIG. 3A, the sleeve 22d spline-engages only with the connection piece 22a, and both of the gears G31 and G41 are therefore rotatably movable relative to the input shaft A2. When the sleeve 22d is at a 3rd-gear-position-connection position shown in FIG. 3B, the sleeve 22d spline-engages with the connection pieces 22a and 22b. Accordingly, the gear G31 is rotatably immovable relative to the input shaft A2, whereas the gear G41 is rotatably movable relative to the input shaft A2. When the sleeve 22d is at a 4th-gear-position-connection position shown in FIG. 3C, the sleeve 22d spline-engages with the connection pieces 22a and 22c. Accordingly, the gear G41 is rotatably immovable relative to the input shaft A2, whereas the gear G31 is rotatably movable relative to the input shaft A2.

As shown in FIGS. 4A and 4B, the third changeover mechanism 23 comprises a gear G51 axially supported by and rotatably movable relative to the input shaft A2, a gear G52 axially supported by and rotatably immovable relative to the output shaft A3 so as to always mesh with the gear G51. Further, the third changeover mechanism 23 comprises a connection piece 23a which rotates integrally with the input shaft A2, a connection piece 23b which rotates integrally with the gear G51, a sleeve 23d, and an actuator 26.

The sleeve 23d is provided so as to be movable in the axial direction of the input shaft A2. A position of the sleeve 23d along the axial direction is controlled by the actuator 26. The sleeve 23d is able to spline-engage with the connection pieces 23a and 23b. When the sleeve 23d is at a non-connection position (neutral position) shown in FIG. 4A, the sleeve 23d spline-engages only with the connection piece 23a, and the gears G51 is therefore rotatably movable relative to the input shaft A2. When the sleeve 23d is at a 5th-gear-position-connection position shown in FIG. 4B, the sleeve 23d spline-engages with the connection pieces 23a and 23b. Accordingly, the gear G51 is rotatably immovable relative to the input shaft A2.

When the gear position is set at "the 1st gear position", the changeover mechanisms 21, 22, and 23 are controlled to "the 1st-gear-position-connection position", "the neutral position", and "the neutral position", respectively. Consequently, a power transmission path is provided/realized between the input shaft A2 and the output shaft A3 through the gears G11, and G12, and the transmission reduction ratio Gtm becomes equal to (the number of teeth of the gear G12)/(the number of teeth of the gear G11). This value is also expressed as Gtm(1). When the gear position is set at "the 2nd gear position", the changeover mechanisms 21, 22, and 23 are controlled to "the 2nd-gear-position-connection position", "the neutral position", and "the neutral position", respectively. Consequently, a power transmission path is provided/realized between the input shaft A2 and the output shaft A3 through the gears G21, and G22, and the transmission reduction ratio Gtm becomes equal to (the number of teeth of the gear G22)/(the number of teeth of the gear G21). This value is also expressed as Gtm(2).

When the gear position is set at "the 3rd gear position", the changeover mechanisms 21, 22, and 23 are controlled to "the neutral position", "the 3rd-gear-position-connection position", and "the neutral position", respectively. Consequently, a power transmission path is provided/realized between the input shaft A2 and the output shaft A3 through the gears G31, and G32, and the transmission reduction ratio Gtm becomes equal to (the number of teeth of the gear G32)/(the number of teeth of the gear G31). This value is also expressed as Gtm(3). When the gear position is set at "the 4th gear position", the changeover mechanisms 21, 22, and 23 are controlled to "the neutral position", "the 4th-gear-position-connection position", and "the neutral position", respectively. Consequently, a power transmission path is provided/realized between the input shaft A2 and the output shaft A3 through the gears G41, and G42, and the transmission reduction ratio Gtm becomes equal to (the number of teeth of the gear G42)/(the number of teeth of the gear G41). This value is also expressed as Gtm(4).

When the gear position is set at "the 5th gear position", the changeover mechanisms 21, 22, and 23 are controlled to "the neutral position", "the neutral position", and "the 5th-gear-position-connection position", respectively. Consequently, a power transmission path is provided/realized between the input shaft A2 and the output shaft A3 through the gears G51, and G52, and the transmission reduction ratio Gtm becomes equal to (the number of teeth of the gear G52)/(the number of teeth of the gear G51). This value is also expressed as Gtm(5). In this manner, in the T/M 20, the actuators 24, 25, and 26 are controlled so that the transmission reduction ratio Gtm can be set at one of the five reduction ratios. Here, a relation Gtm(1) >Gtm(2)>Gtm(3)>Gtm(4)>Gtm(5) is satisfied.

The C/T 30 comprises a well-known structure and is configured in such a manner that the C/T 30 can break (or shut) and provide (or realize) a power transmission path between the output shaft A1 of the E/G 10 and the input shaft A2 of the T/M 20. In the vehicle, a clutch pedal is not provided. A state of the C/T 30 is controlled only by an actuator 31. When the C/T 30 is in a connection state, the output shaft A1 of the E/G 10 and the input shaft A2 of the T/M 20 rotate at the same rotational speed.

The M/G 40 comprises a well-known structure (e.g., an AC synchronous motor), and is configured in such a manner that the a rotor 41 rotates integrally with an output shaft A4 which is provided coaxially with and is rotatably movable relative to the input shaft A2 of the T/M 20. The M/G 40 functions as the power source as well as the electric power generator.

Figure 5:
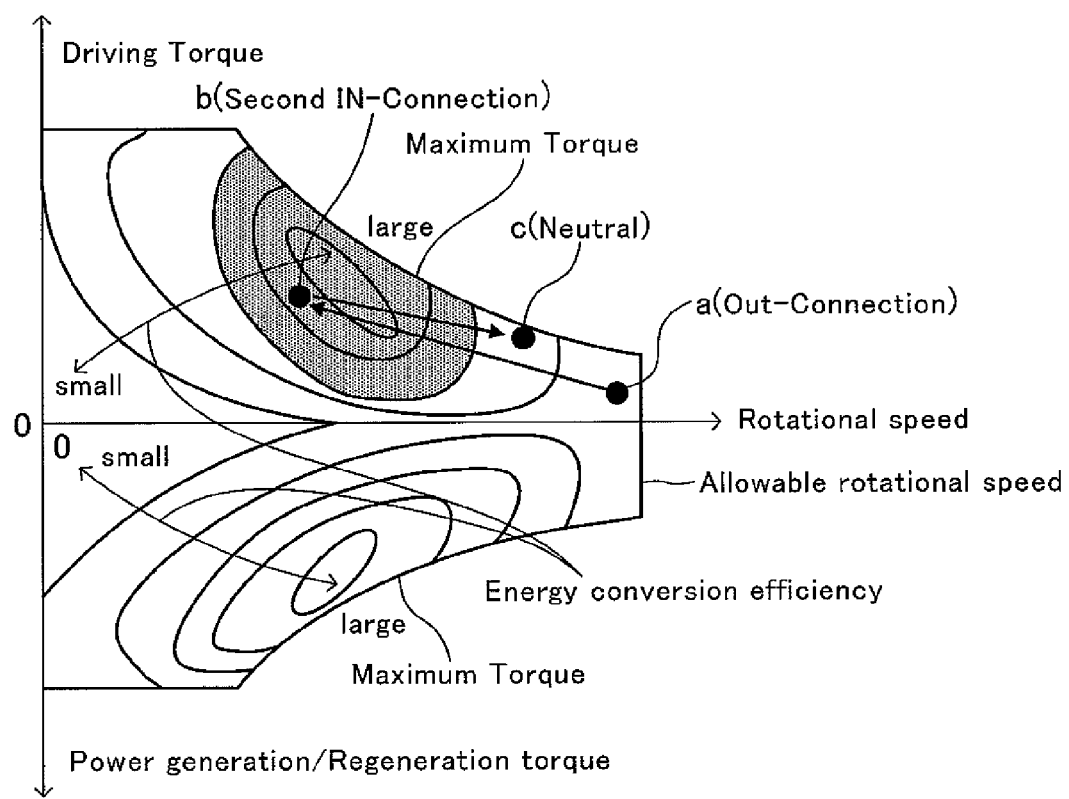
FIG. 5 is a graph showing a relation among a rotational speed, a maximum torque, and an energy conversion efficiency, of the motor generator shown in FIG. 1.

FIG. 5 shows a relation among the rotational speed of the output shaft A4 of the M/G 40, a maximum torque which the M/G 40 can generate, and the energy conversion efficiency (torque generating efficiency). As shown in FIG. 5, the maximum torque which the M/G 40 can generate is constant when the rotational speed of the output shaft A4 is smaller than a certain value, and decreases as the rotational speed increases when the rotational speed is larger than the certain value. Further, the M/G 40 does not generate any torque when the rotational speed is larger than an allowable rotational speed. In addition, the energy conversion efficiency (torque generating efficiency) can becomes the largest when the rotational speed of the output shaft A4 is at another certain value, and becomes smaller as an absolute value of a difference between the rotational speed and the another certain value becomes larger. That is, the energy conversion efficiency decreases as the rotational speed comes closer to the allowable rotational speed.

The changeover mechanism 50 is a mechanism which changes (over) a connection state of the output shaft A4 of the M/G 40. The changeover mechanism 50 comprises a connection piece 51 which rotates integrally with the rotor 41, a connection piece 52 which rotates integrally with the input shaft A2 of the T/M 20, a connection piece 53 axially supported by and rotatably movable relative to the input shaft A2, a sleeve 54, and an actuator 55. Further, the changeover mechanism 50 comprises a gear Go1 which rotates integrally with the connection piece 53 and is axially supported by and rotatably movable relative to the input shaft A2, and a gear Go2 which rotates integrally with the output shaft A3 of the T/M 20 and always meshes with the gear Go1.

The sleeve 54 is provided so as to be movable in the axial direction of the input shaft A2 of the T/M 20. A position of the sleeve 54 along the axial direction is controlled by the actuator 55. The sleeve 54 is able to spline-engage with the connection pieces 51, 52, and 53.

Figure 6:
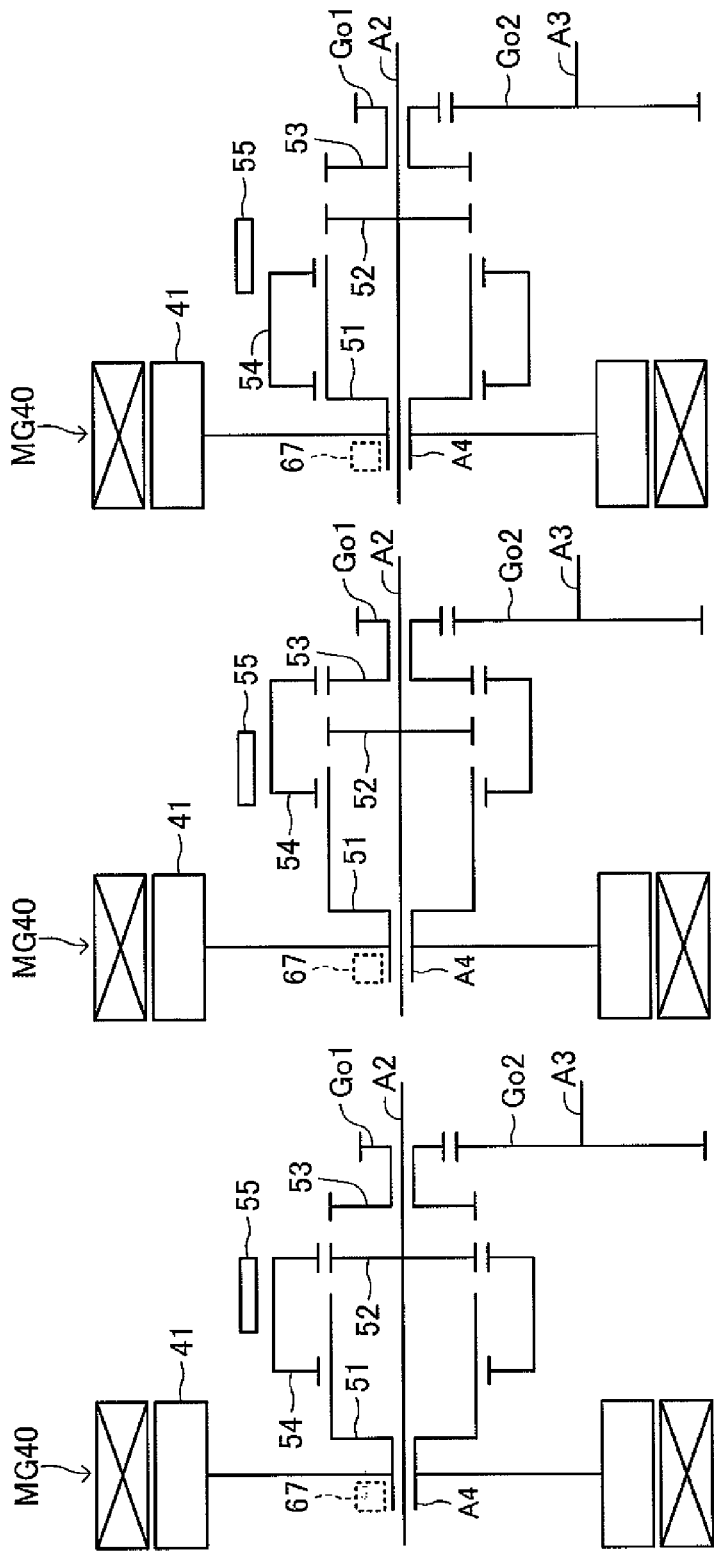
FIG. 6A is a schematic view showing one of three states which the changeover mechanism shown in FIG. 1 can realize.
FIG. 6B is a schematic view showing one of three states which the changeover mechanism shown in FIG. 1 can realize.
FIG. 6C is a schematic view showing one of three states which the changeover mechanism shown in FIG. 1 can realize.

When the sleeve 54 is controlled to an IN-Connection position shown in FIG. 6A, the sleeve 54 spline-engages with the connection pieces 51 and 52. Accordingly, the output shaft A4 of the M/G 40 and the input shaft A2 of the T/M 20 become rotatably immovable to each other. This provides/realizes a power transmission path between the input shaft A2 of the T/M 20 and the output shaft A4 of the M/G 40. This state is referred to as an "IN-Connection State".

In the IN-Connection State, a ratio of a rotational speed of the output shaft A4 of the M/G 40 to a rotational speed of the input shaft A2 of the T/M 20 is referred to as a "first reduction ratio G1", and a product of the first reduction ratio G1 and the transmission reduction ratio Gtm is referred to as an "IN-connection reduction ratio Gin". In the present example, G1=1, and therefore Gin=Gtm. That is, the IN-connection reduction ratio Gin varies in accordance with the gear position of the T/M 20.

When the sleeve 54 is controlled to an OUT-Connection position shown in FIG. 6B, the sleeve 54 spline-engages with the connection pieces 51 and 53. Accordingly, the output shaft A4 of the M/G 40 and the gear Go1 become rotatably immovable to each other. This provides/realizes a power transmission path between the output shaft A3 of the T/M 20 and the output shaft A4 of the M/G 40 through the gear Got and the gear Go2, without involving the T/M 20. This state is referred to as an "OUT-Connection State".

In the OUT-Connection State, a ratio of a rotational speed of the output shaft A4 of the M/G 40 to a rotational speed of the output shaft A3 of the T/M 20 is referred to as an "OUT-connection reduction ratio Gout". In the present example, the OUT-connection reduction ratio Gout is equal to (the number of teeth of the gear Go2)/(the number of teeth of the gear Got) and thus is constant. That is, the OUT-connection reduction ratio Gout does not vary in accordance with a change in the gear position of the T/M 20. In the present example, the OUT-connection reduction ratio Gout is set at a value which is roughly equal to the Gtm(2), for example.

When the sleeve 54 is controlled to a non-connection position (neutral position) shown in FIG. 6C, the sleeve 54 spline-engages only with the connection piece 51. Accordingly, both the input shaft A2 and the gear Go1 are rotatably movable relative to the output shaft A4. Accordingly, neither a power transmission path between the output shaft A3 of the T/M 20 and the output shaft A4 nor a power transmission path between the input shaft A2 of the T/M 20 and the output shaft A4 is provided. This state is referred to as a "non-connection state (neutral state)".

As described above, the changeover mechanism 50 selectively change the connection state of the output shaft A4 of the M/G 40 into one of "the IN-Connection State", "the OUT-Connection State", and "the neutral state".

As shown in FIG. 1, a gear Gf1 is axially supported by and rotatably immovable relative to the output shaft A3 of the T/M 20. The gear Gf1 always meshes with a gear Gf2. The gear Gf2 is connected with a differential mechanism DIF comprising one of well-known configurations. The differential mechanism DIF is connected a pair of drive wheels including a left drive wheel and a right drive wheel. It should be noted that the (the number of teeth of the gear Gf2)/(the number of teeth of the gear Gf1) corresponds to a so-called final reduction ratio.

The present apparatus further comprises a wheel speed sensor 61 which detects a wheel speed of the drive wheels, an acceleration pedal opening degree sensor 62 which detects an operation amount of an acceleration pedal AP, and a shift position sensor 63 which detects a position of a shift lever SF.

The present apparatus further comprises an electronic control unit ECU 70. The ECU 70 controls the actuators 24, 25, 26, 31, and 55, based on information from the sensors 61-63 and the like to thereby control the gear position of the T/M 20 and the state of the C/T 30. Further, the ECU 70 controls the output (driving torque) of each of the E/G 10 and M/G 40, and so on.

The gear position of the T/M 20 is controlled based on a vehicle speed V obtained from the wheel speed sensor 61, a required driving torque T calculated based on the operation amount of the acceleration pedal AP obtained from the acceleration pedal opening degree sensor 62, and the shift lever position SF obtained from the shift lever position sensor 63. When the shift lever position SF is at a position corresponding to a "manual mode", the gear position of the T/M 20 is basically set at a gear position selected by the driver who operates the shift lever SF. On the other hand, when the shift lever position SF is at a position corresponding to an "automatic mode", the gear position of the T/M 20 is automatically controlled to one of the 1st to the 5th gear positions in accordance with "a combination of the vehicle speed V and the required driving torque T" and "the Map" shown in FIG. 7, even when the shift lever SF is not operated.

Figure 7:
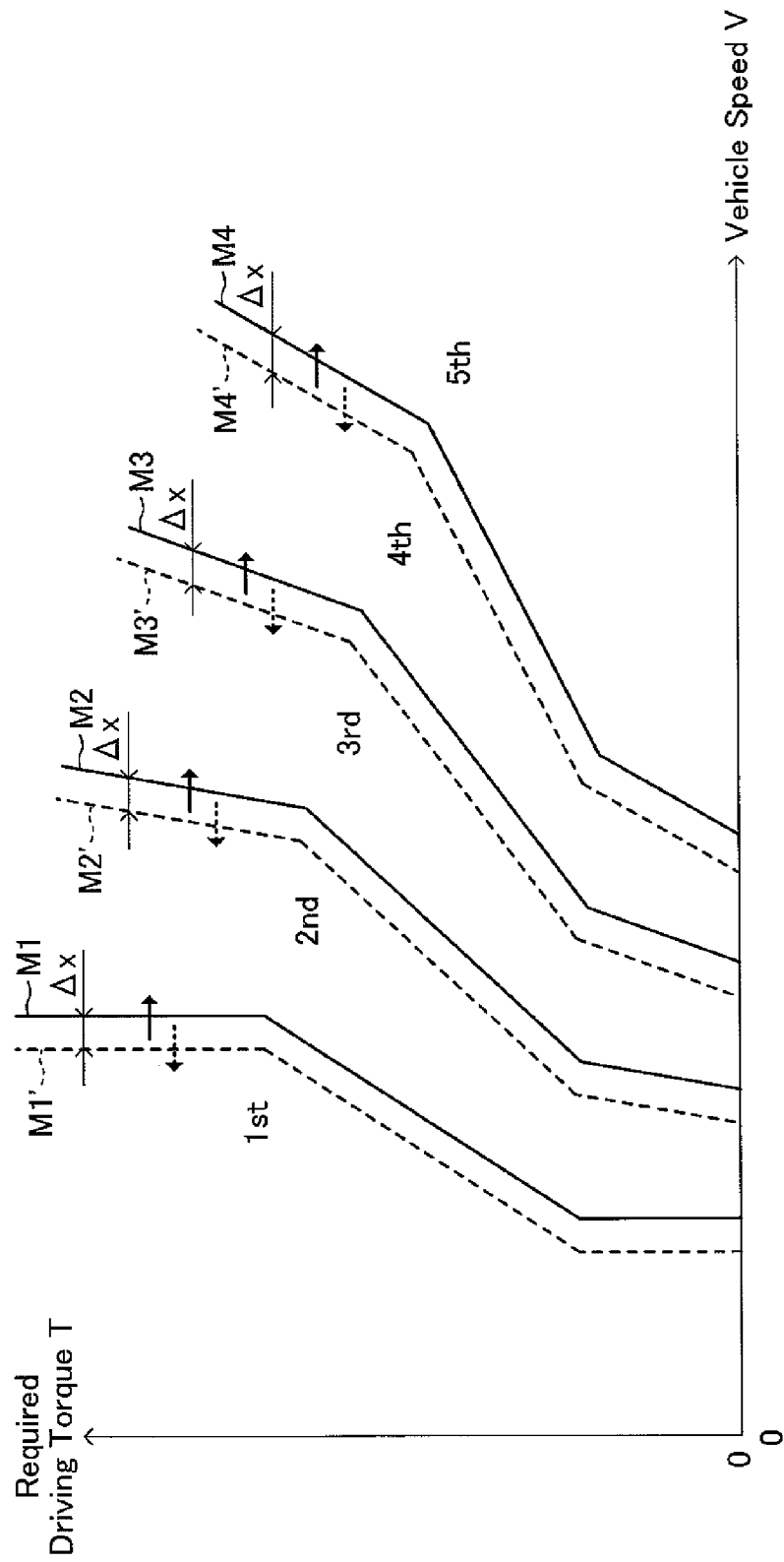
FIG. 7 is a graph showing a map defining a relation among a vehicle speed and a required driving torque as well as a gear position of the transmission to be selected, when the power transmission control apparatus shown in FIG. 1 is applied.

In FIG. 7, each of the solid lines M1-M4 shows each of boundary lines which causes a shift up (a shift up operation, or a gear position change operation to decrease the transmission reduction ratio Gtm) with an increase in the vehicle speed V, and each of the dashed lines M1'-M4' shows each of boundary lines which causes a shift down (a shift down operation, or a gear position change operation to increase the transmission reduction ratio Gtm) with a decrease in the vehicle speed V. The reason why a difference Δx is provided between the each solid line and the each dashed line as shown is to suppress an occurrence of a situation (so-called hunting) in which the shift up and the shift down are performed frequently even though they are not necessary, when the vehicle speed V fluctuates (increases and decreases) around each of the values corresponding the solid lines.

A state of the C/T 30 is generally kept at the connection state, and is temporarily changed from the connection state to the non-connection state during the shift up operation and the shift down operation, and so on.

The M/G 40 is used as a driving power source generating a driving torque for driving the vehicle together with the E/G 10 or by itself, or is used as a power source for starting the E/G 10. Further, the M/G 40 is used as an electric motor generator for generating a regeneration torque to provide a breaking force to the vehicle, or is used as an electric motor generator for generating an electric power which is supplied to and stored in a battery (not shown) of the vehicle.

When the M/G 40 is used as the driving power source for driving the vehicle, a distribution between the output (driving torque) of the E/G 10 and the output (driving torque) of the M/G 40 is adjusted in such a manner that a sum of the driving torque transmitted to the drive wheels based on the output of the E/G 10 and the driving torque transmitted to the drive wheels based on the output of the M/G 40 coincides with the required driving torque T, according to one of well-known methods.

(Selection of the Connection State of the Output Shaft A4 of the M/G 40)

Next will be described how to select the (a target) connection state of the output shaft A4 of the M/G 40. The connection state of the output shaft A4 of the M/G 40 is automatically selected in accordance with "a combination of the vehicle speed V and the required driving torque T" and the map shown in FIG. 8.

Figure 8:
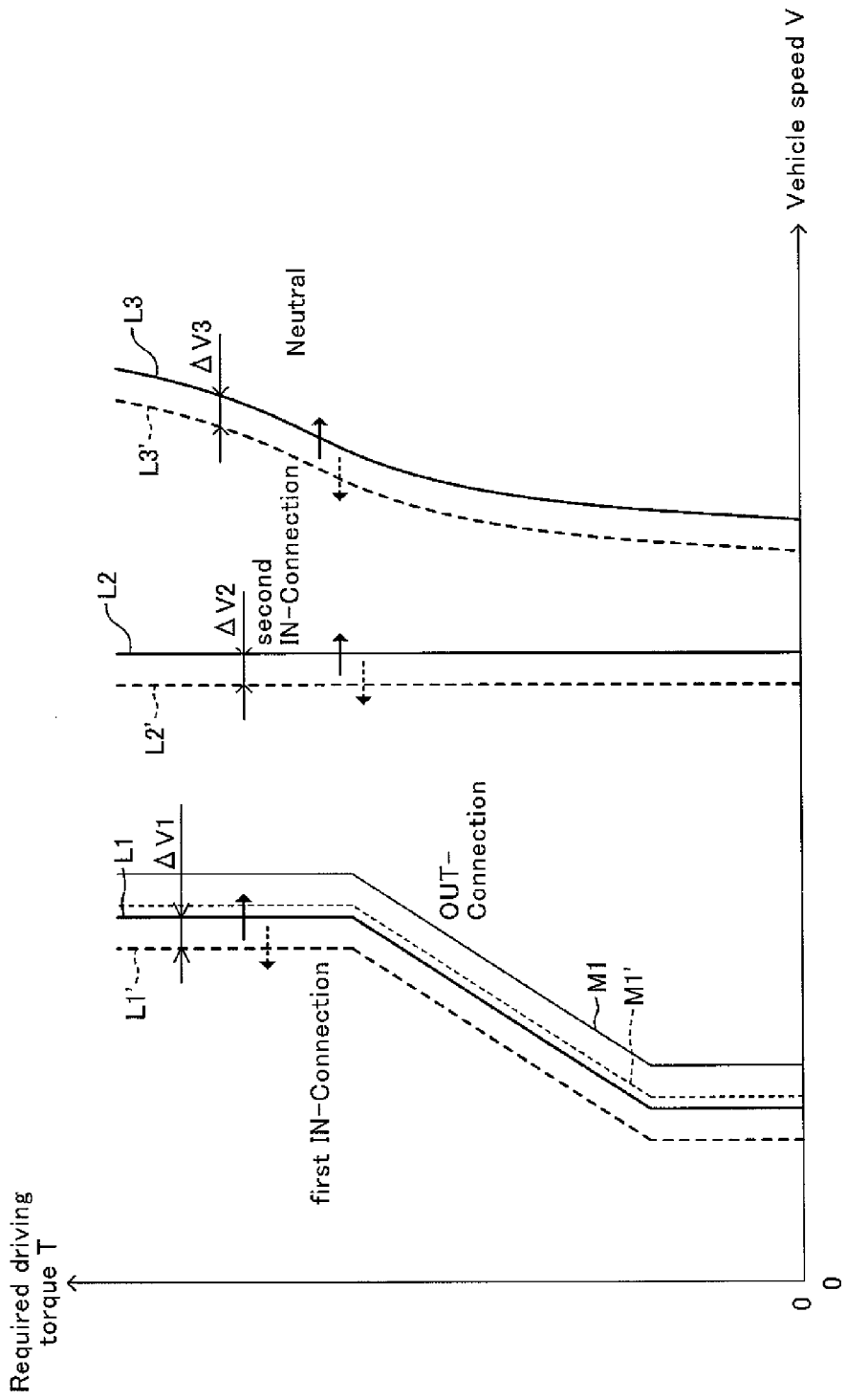
FIG. 8 is a graph showing a map defining a relation among the vehicle speed and the required driving torque, and a connection state to be selected in the changeover mechanism, when the power transmission control apparatus shown in FIG. 1 is applied.

As shown in FIG. 8, four areas (or regions) are defined with respect to "the combination of the vehicle speed V and the required driving torque T", i.e., a first IN-Connection area, an OUT-Connection area, a second IN-Connection area, and a neutral area (non-connection are). In the first and second IN-Connection areas, "the In-Connection State" is selected. In the OUT-Connection area, "the OUT-Connection State" is selected. In the neutral area, "the neutral state (non-connection state)" is selected. Hereinafter, "the IN-Connection States" corresponding to the first IN-Connection area and the second IN-Connection area are referred separately to as "a first-IN-Connection State" and "a Second-Connection State", respectively.

A changeover from "the first-IN-Connection State" to "the OUT-Connection State" is carried out, when the vehicle speed V passes through/over the boundary line L1 (corresponding to "the first threshold" described above) while the vehicle speed V is increasing. A changeover from "the OUT-Connection State" to "the second-IN-Connection State" is carried out, when the vehicle speed V passes through/over the boundary line L2 (corresponding to "the second threshold" described above) while the vehicle speed V is increasing. A changeover from "the second-IN-Connection State" to "the neutral state" is carried out, when the vehicle speed V passes through/over the boundary line L3 (corresponding to "the third threshold" described above) while the vehicle speed V is increasing.

On the other hand, a changeover from "the OUT-Connection State" to "the first-IN-Connection State" is carried out, when the vehicle speed V passes through/over the boundary line L1' (corresponding to "the first threshold-a second deviation") while the vehicle speed V is decreasing. A changeover from "the second-IN-Connection State" to "the OUT-Connection State" is carried out, when the vehicle speed V passes through/over the boundary line L2' (corresponding to "the second threshold-a first deviation") while the vehicle speed V is decreasing. A changeover from "the neutral state" to "the second-IN-Connection State" is carried out, when the vehicle speed V passes through/over the boundary line L3' (corresponding to "the third threshold-a third deviation") while the vehicle speed V is decreasing.

The reason why differences ΔV1, ΔV2, and ΔV3 between the boundary lines L1 and L1', between the boundary lines L2 and L2', and between the boundary lines L3 and L3', respectively, are provided is to suppress an occurrence of a situation (so-called hunting) in which the changeover of the connection state of the output shaft A4 are performed frequently, when the vehicle speed V fluctuates (increases and decreases) around each of the boundary lines L1, L2, and L3.

The boundary line L1 (low speed area) is set at a vehicle speed slightly smaller than a vehicle speed corresponding to the shift up from the 1st gear position to the 2nd gear position. That is, the boundary line L1 is provided at a location obtained by slightly shifting (moving) the boundary line M1 (the solid line) shown in FIG. 7 in a direction (leftward direction in the figure) in which the vehicle speed V decreases, the boundary line M1 corresponding to the shift up from the 1st gear position to the 2nd gear position. Accordingly, the boundary line L1 shown in FIG. 8 has the same shape as "the boundary line (the solid line) M1 shown in FIG. 7" corresponding to the shift up from the 1st gear position to the 2nd gear position.

The boundary line L2 (middle speed area) is set at a vehicle speed obtained when the rotational speed of the output shaft A4 of the M/G 40 in "the OUT-Connection State" coincides with a value (e.g. a value slightly smaller than the allowable rotational speed) determined based on the allowable rotational speed (refer to FIG. 5). Further, in the present example, the boundary line L2 is located in a region corresponding to the 3rd gear position to the 5th gear position shown in FIG. 7. As described above, the OUT-connection reduction ratio Gout is constant (e.g., a ratio roughly equal to the Gtm(2) in the present example) irrespective of the gear position of the T/M 20. Accordingly, in the OUT-Connection State", a vehicle speed at which the rotational speed of the output shaft A4 of the M/G 40 coincides with "the above described value determined based on the allowable rotational speed" is determined as a single value, irrespective of the gear position of the T/M 20. Accordingly, the vehicle speed V corresponding to the boundary line L2 shown in FIG. 8 is constant irrespective of the required driving torque T. That is, the boundary line L2 becomes a line extending in a vertical direction in FIG. 8. The vehicle speed V corresponding to the boundary line L2 is determined based on "the OUT-connection reduction ratio" and "the final reduction ratio" described above.

The boundary line L3 (high speed area) is set at a vehicle speed obtained when the energy conversion efficiency (in the driving torque side) of the M/G 40 in "the (second) IN-Connection State" coincides with a boundary (especially at the side where the vehicle speed is larger, or the rightward side in the figure) defining an area (refer to an area where fine dots are provided in FIG. 5) in which the energy conversion efficiency of the M/G 40 is larger than or equal to a predetermined value (e.g., 70%).

Next will be described advantages obtained by selecting the connection state of the output shaft A4 of the M/G 40 as shown in FIG. 8. Notably, it is assumed that the OUT-connection reduction ratio Gout is roughly equal to the Gtm(2), for example and just for description convenience First, the function/effect realized by "a feature that the (first) In-Connection State is selected after the vehicle starts to drive when the vehicle speed V is zero" is described. Generally, when the vehicle starts to drive, the gear position of the T/M 20 is set at the 1st gear position, and the IN-connection reduction ratio Gin (=Gtm(1)) is therefore larger than the OUT-connection reduction ratio Gout. Accordingly, the driving torque, which is transmitted to the drive wheels and which is based on the output of the M/G 40, can be made larger, compared to a case where the OUT-Connection State is selected. Consequently, a large driving torque at the drive wheels can be generated when the vehicle starts to drive.

Next, the function/effect realized by "a feature that the boundary line L1 is set at the vehicle speed slightly smaller than the vehicle speed corresponding to the shift up from the 1st gear position to the 2nd gear position" is described. When the vehicle speed passes through/over the boundary line L1 (low speed area) while the vehicle speed is increasing under the "the (first) In-Connection State" after the start of the vehicle, the changeover from the "the (first) In-Connection State" to "the OUT-Connection State" is carried out. This changeover occurs before the shift up from the 1st gear position to the 2nd gear position is carried out. In other words, the shift up from the 1st gear position to the 2nd gear position is carried out under "the OUT-Connection State" after the changeover to the OUT-Connection State is completed. As described in the summary of the present invention, the "OUT-Connection State" allows the driving torque of the M/G 40 to be continuously transmitted to the output shaft A3 of the T/M 20 (and therefore to the drive wheels) even during the gear position shifting operation by the T/M 20, and the shift shock can therefore be suppressed. Especially, a severe shift shock tends to occur when the gear position is changed from the 1st gear position to the 2nd gear position, since the change amount in the transmission reduction ratio Gtm is large. In view of the above, it is possible to remarkably moderate the shift shock which occurs when the gear position is changed from the 1st gear position to the 2nd gear position by the feature described above.

Furthermore, the changeover from "the (first) In-Connection State" to "the OUT-Connection State" is carried out under the 1st gear position. That is, this changeover from "the (first) In-Connection State" to "the OUT-Connection State" is carried out while the OUT-connection reduction ratio Gout (roughly equal to Gtm(2)) is smaller than the IN-connection reduction ratio Gin (=Gtm(1)). Accordingly, this changeover decreases the rotational speed of the output shaft A4 of the M/G 40. It should be reminded that, as described above, the maximum torque which the M/G 40 can generate becomes larger as the rotational speed of the output shaft A4 is smaller (refer to FIG. 5). Therefore, the changeover described above can also provide the effect that the maximum torque which the M/G 40 can generate is increased/expanded.

Next will be described the function/effect realized by "a feature that the boundary line L2 is set at the vehicle speed obtained when the rotational speed of the output shaft A4 in "the OUT-Connection State" coincides with the value determined based on the allowable rotational speed". When the vehicle speed passes through/over the boundary line L2 while the vehicle speed is increasing under "the OUT-Connection State", the changeover from the "OUT-Connection State" to "the (second) IN-Connection State" is carried out. As described above, the boundary line L2 is located in the region corresponding to the 3rd gear position to 5th gear position shown in FIG. 7. Accordingly, this changeover occurs while one of the 3rd, 4th, and 5th gear positions (i.e., while the gear positions higher than or equal to the 3rd gear position) is selected. That is, this changeover occurs while the IN-connection reduction ratio Gin (=one of Gtm(3), Gtm(4), and Gtm(5)) is smaller than the OUT-connection reduction ratio Gout (which is roughly equal to Gtm(2)). Accordingly, this changeover allows the rotational speed of the output shaft A4 of the M/G 40 to decrease from a value close to the allowable rotational speed (refer to a movement from a point "a" to a point "b" in FIG. 5). As a result, the rotational speed of the output shaft A4 can be retained smaller than the allowable control rotational speed. In addition, the maximum torque that the M/G 40 can generate can be increased.

Next will be described a function/effect realized by "a feature that the boundary line L3 is set at the vehicle speed obtained when the energy conversion efficiency of the M/G 40 under "the (second) IN-Connection State" coincides with the boundary defining the area in which the energy conversion efficiency of the M/G 40 under "the (second) IN-Connection State" is larger than or equal to the predetermined value". When the vehicle speed passes through/over the boundary line L3 while the vehicle speed is increasing under "the (second) IN-Connection State", the changeover from "the (second) IN-Connection State" to "the neutral state" is carried out. Consequently, driving the M/G 40 is stopped, and a driving torque equal to the required driving torque T is generated only by the E/G 10. A timing at which the vehicle speed passes through/over the boundary line L3 while the vehicle speed is increasing (i.e., while the rotational speed of the output shaft A4 of the M/G 40 is increasing) means a timing at which the energy conversion efficiency of the M/G 40 passes thorough/over a part of the boundary defining the area in which the fine dots are provided in FIG. 5, the part being at a higher vehicle speed (rightward side in FIG. 5) (refer to a movement from a point "b" to a point "c" in FIG. 5). In other words, when a state of the M/G 40 has changed from a state in which the energy conversion efficiency is larger than or equal to the predetermined value to a state in which the energy conversion efficiency is smaller than the predetermined value, the changeover from "the second IN-Connection State" to "the neutral state" is carried out. In the meantime, an energy generation efficiency of the E/G 10 is generally high in the high speed area where the energy conversion efficiency of the M/G 40 is low in most cases. In this state, the total energy efficiency (fuel consumption) of the vehicles as a whole can be more improved by having only the E/G 10 generate the driving torque equal to the required driving torque T than by having both the M/G 40 and the E/G 10 cooperatively generate the driving torque equal to the required driving torque T. In view of the above, the total energy efficiency (fuel consumption) of the vehicles as a whole can be improved in a case in which the energy conversion efficiency of the M/G 40 in the high speed area under "the (second) IN-Connection State" becomes lower than the predetermined value.

As described above, the vehicular power transmission control apparatus according to the embodiment of the present invention is applied to the vehicle comprising, as power sources, the E/G 10 and the M/G 40, and further comprising the so-called automated manual transmission utilizing the T/M 20 which does not comprise a torque convertor. The apparatus comprises the changeover mechanism 50 which can select, as the connection state of the output shaft A4 of the M/G 40, one of "the IN-Connection State", "the OUT-Connection State", and "the neutral state", the IN-Connection State being the state in which the power transmission path between the input shaft A2 of the T/M 20 and the output shaft A4 of the M/G 40 is provided/made/realized, the OUT-Connection State being the state in which the power transmission path between the output shaft A3 of the T/M 20 and the output shaft A4 of the M/G 40 is provided/made/realized, and the neutral state being the state in which no power transmission path among these shafts is provided/made/realized. The selection for the connection state is made based on the combination of the vehicle speed V and the required driving torque T. "The (first) IN-Connection State" is selected when the vehicle starts to drive, the changeover from "the (first) IN-Connection State" to "the OUT-Connection State" is carried out when the vehicle speed V passes through/over the boundary line L1 while the vehicle speed V is increasing, the changeover from "the OUT-Connection State" to "the (second) IN-Connection State" is carried out when the vehicle speed V passes through/over the boundary line L2 while the vehicle speed V is increasing, and the changeover from "the (second) IN-Connection State" to "the neutral state" is carried out when the vehicle speed V passes through/over the boundary line L3 while the vehicle speed V is increasing. Accordingly, one of the IN-Connection State, the OUT-Connection State, and the neutral state can be selected as the connection state of the output shaft A4 of the M/G 40 appropriately for the vehicle driving condition.

The present invention is not limited to the embodiment described above, but may be modified as appropriate without departing from the scope of the invention. For example, the so-called automated manual transmission which uses the multiple gear ratio transmission but which does not include a torque converter is used as the transmission, however, a multiple gear ratio transmission or a continuously variable transmission (a so-called automatic transmission (AT)) may be used as the transmission, each including a torque convertor and automatically performing an operation for a gear position change in accordance with the vehicle driving condition. In this case, the C/T 30 is omitted.

Further, a transmission (a so-called manual transmission (MT)) may be used as the transmission, the manual transmission being a multiple gear ratio transmission without the torque converter, performing an operation for a gear position change directly (without using an actuator) by an operation of a link mechanism caused by an operating force supplied to the shift lever from the driver Further, in the embodiment described above, the changeover mechanism 50 is configured so as to be able to select one out of "the IN-Connection State", "the OUT-Connection State", and "the neutral state", however, the changeover mechanism 50 may be configured so as to be able to select one out of "the IN-Connection State" and "the OUT-Connection State" only. In this case, the boundary lines L3 and L3' shown in FIG. 8 are omitted so that the neutral area in FIG. 8 is united/merged into the (second) IN-Connection area. Furthermore, the changeover mechanism 50 may be configured so as to be able to select one out of "the IN-Connection State" and "the neutral state" only. In this case, the boundary lines L1, L1', L2, and L2' shown in FIG. 8 are omitted so that the OUT connection area in FIG. 8, the first IN connection area in FIG. 8, and the second IN connection area in FIG. 8 are united/merged into a single IN-Connection area. Moreover, the changeover mechanism 50 may be configured so as to be able to select one out of "the OUT-Connection State" and "the neutral state". In this case, the boundary lines L1, L1', L2, and L2' shown in FIG. 8 are omitted so that the first IN connection area in FIG. 8 and the second IN connection area in FIG. 8 are united/merged into the OUT-Connection area.

In the embodiment described above, as one example of "the OUT-connection reduction ratio Gout", the value substantially equal to the transmission reduction ratio Gtm(2) corresponding to the 2nd gear position is used, however, a different value (for example, a value between the Gtm(2) and the Gtm(3), or a value substantially equal to the Gtm(3)) may be used as the OUT-connection reduction ratio Gout. It should be noted that the vehicle speed corresponding to the boundary line L2 shown in FIG. 8 becomes smaller (or larger) as the Gout becomes larger (or smaller). That is, the vehicle speed corresponding to the boundary line L2 can be adjusted by adjusting the Gout.

Further, in the embodiment described above, the boundary line L1 shown in FIG. 8 is set at the vehicle speed slightly smaller than the vehicle speed corresponding the vehicle speed at which the shift up (from the 1st gear position to the 2nd gear position) is carried out, however, the boundary line L1 may be set differently based on another view as long as "the Gout<the Gin" is satisfied. Similarly, the boundary line L2 shown in FIG. 8 is set at the vehicle speed obtained when the rotational speed of the output shaft A4 of the M/G 40 in "the OUT-Connection State" coincides with the value determined based on the allowable rotational speed, however, the boundary line L2 may be set differently based on another view as long as "the Gin<the Gout" is satisfied. Further, the boundary line L3 shown in FIG. 8 is set at the vehicle speed obtained when the energy conversion efficiency of the M/G 40 in "the (second) In-Connection State" is at the boundary defining the area in which the energy conversion efficiency of the M/G 40 in "the (second) In-Connection State" is larger than or equal to the predetermined value, however, the boundary line L3 may be set differently based on another view as long as "the Gin<the Gout" is satisfied.

Further, in the embodiment described above, the connection state of the output shaft A4 of the M/G 40 is selected/ determined based on the combination of the vehicle speed V and the required driving torque T (refer to FIG. 8), but the connection state of the output shaft A4 of the M/G 40 may be selected/determined based on a combination of any one selected from "the vehicle speed V, the rotational speed of the output shaft A1 of the E/G 10, the rotational speed of the input shaft A2 of the T/M 20, and the rotational speed of the output shaft A4 of the M/G 40" and any one selected from "the required driving torque T, the operation amount of the acceleration pedal AP, and the opening degree of a throttle valve (not shown) disposed in an intake passage of the E/G 10". The opening degree of the throttle valve may be obtained from a throttle valve opening degree sensor 64. The rotational speed of the output shaft A1 of the E/G 10, the rotational speed of the input shaft A2 of the T/M 20, and the rotational speed of the output shaft A4 of the M/G 40 may be obtained from a rotational speed of the engine output shaft sensor 65, a rotational speed of the transmission input shaft sensor 66, and a rotational speed of the electric motor output shaft sensor 67, respectively.

Further, in the embodiment described above, the difference $\Delta V1$, $\Delta V2$, and $\Delta V3$ may be the same to one another or different to one another. In addition, the difference $\Delta V1$, $\Delta V2$, and $\Delta V3$ may be constant, or varied in accordance with the vehicle driving condition (for example, an acceleration of the vehicle, a temperature of the M/G 40, an upward/downward inclination of the road, etc.). The difference $\Delta V1$, $\Delta V2$, and $\Delta V3$ may be varied in accordance with a certain operation by the driver (for example, an operation applied to a lever, a switch, and the like).

Figure 9:
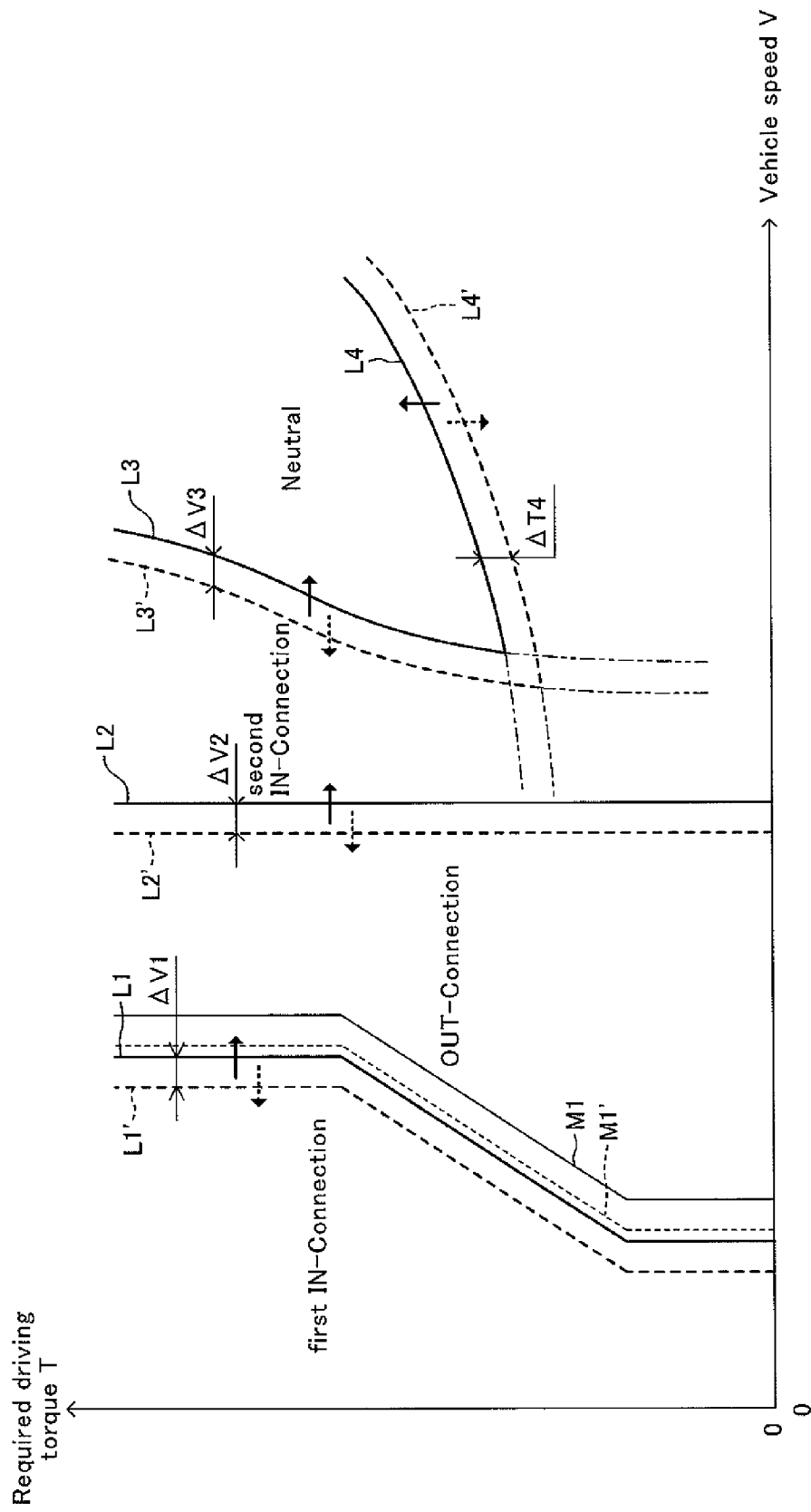
FIG. 9 is a graph showing a modified example of the map shown in FIG. 8.

Furthermore, a map shown in FIG. 9, in place of the map shown in FIG. 8, may be used for selecting/controlling the connection state of the output shaft A4 of the M/G 40. FIG. 9 is different from FIG. 8 only in that the boundary lines L4 and L4' are added. Hereinafter, a description is made with focusing on the difference only. According to the map shown in FIG. 9, the changeover from "the second IN-Connection State" to "the neutral state" is carried out, (1) when the vehicle speed V passes through/over the boundary line L3 while the vehicle speed V is increasing in a case in which the required driving torque T is larger than the boundary line L4, or (2) when the required driving torque T passes through/over the boundary line L4 while the required driving torque T is increasing in a case in which the vehicle speed is larger than the boundary line L3. According to the map shown in FIG. 9, the changeover from "the neutral state" to "the second IN-Connection State" is carried out (1) when the vehicle speed V passes through/over the boundary line L3' while the vehicle speed V is decreasing, or (2) when the required driving torque T passes through/over the boundary line L4' while the required driving torque T is decreasing.

The boundary line L4 is determined based on a torque (hereinafter, referred to as "a running resistance torque") of the drive wheels corresponding to a running resistance of the vehicle (i.e., a total sum of a frictional resistance of each of various rotational members included in a driving system, a resistance to decelerate the vehicle due to a wind generated with a running of the vehicle, and a resistance to decelerate the vehicle due to an inclination of a road, and so on). When the running resistance torque is equal to the driving torque of the drive wheels, the acceleration (front-rear acceleration) of the vehicle in the front-rear direction of the vehicle becomes zero. When the driving torque of the drive wheels is larger (or smaller) than the running resistance torque, the front-rear acceleration becomes positive (or negative). Accordingly, the boundary line L4 is set at, for example, a driving torque which makes the front-rear acceleration coincide with a predetermined value (for example, zero, a positive slight value, or a negative slight value). That is, the boundary line L4 may be determined/set based on the front-rear acceleration of the vehicle or a parameter (for example, a change rate in the vehicle speed, a change rate in the rotational speed of the engine) varying depending on the front-rear acceleration of the vehicle.

The running resistance torque increases as the vehicle speed increases. Accordingly, as shown in FIG. 9, the boundary L4 increases as the vehicle speed increases. In addition, the running resistance torque becomes larger as the upward inclination of the road becomes larger. Therefore, the boundary line L4 shifts more upwardly as the upward inclination of the road becomes larger. When the required driving torque T is larger than the value corresponding to the boundary line L4, the condition of the vehicle is in an acceleration condition. When the required driving torque T is smaller than the value corresponding to the boundary line L4, the condition of the vehicle is in a deceleration condition.

Next will be described a function/effect realized by the feature described above that "the boundary L4 is set at the predetermined value obtained when the front-rear acceleration coincides with the predetermined value (for example, zero, a positive slight value, or a negative slight value)". In a case where the vehicle is in the acceleration condition, it is preferable that, as described above, the changeover from "the (second) IN-Connection State" to "the neutral state" be carried out when the vehicle speed passes through/over the boundary line L3 while the vehicle speed is increasing, in order to improve the energy conversion efficiency (fuel consumption) of the vehicle as a whole. To the contrary, in a case where the vehicle is in the deceleration condition (that is, the required driving torque T is smaller than the boundary line L4), it is possible to supply an electric power to the battery to store the power in the battery, the electric power being generated by a regeneration by having the M/G 40 generate the regeneration torque by retaining "the (second) IN-Connection State". That is, in this case, selecting "the (second) IN-Connection State" instead of "the neutral state" can more improve the total energy efficiency (fuel consumption) of the vehicle as a whole. In view of the above, in the case where the vehicle is in the deceleration condition, "the (second) IN-Connection State" is preferably retained even though the vehicle speed is larger than the value corresponding to the boundary line L3.

It should be noted that, according to the map shown in FIG. 9, the changeover between "the (second) IN-Connection State" and "the neutral state" is carried out based on the boundary line L4 (or L4'), however, the changeover between "the (second) IN-Connection State" and "the neutral state" may be performed on the basis of whether a change rate in the operation amount of the acceleration pedal AP or in the opening degree of the throttle valve is positive or negative (i.e., the neutral state is selected when the change rate is positive, and the second IN-Connection State is selected when the change rate is negative). Further, the changeover may be carried out on the basis of whether a condition of a brake switch is ON or OFF (i.e., the neutral state is selected when the condition of the brake pedal switch is OFF, and the second IN-Connection State is selected when the condition of the break switch is ON), the brake switch being turned ON when a brake pedal (not shown) is operated. Further, the changeover may be carried out based on an amount (remaining battery level) of an energy saved in the battery (secondary battery) which supplies an electric power to the M/G 40 (i.e., the neutral state is selected when the remaining battery level is larger than a predetermined level, and the second IN-Connection State is selected when the remaining battery level is smaller than a predetermined level).

Figure 10:
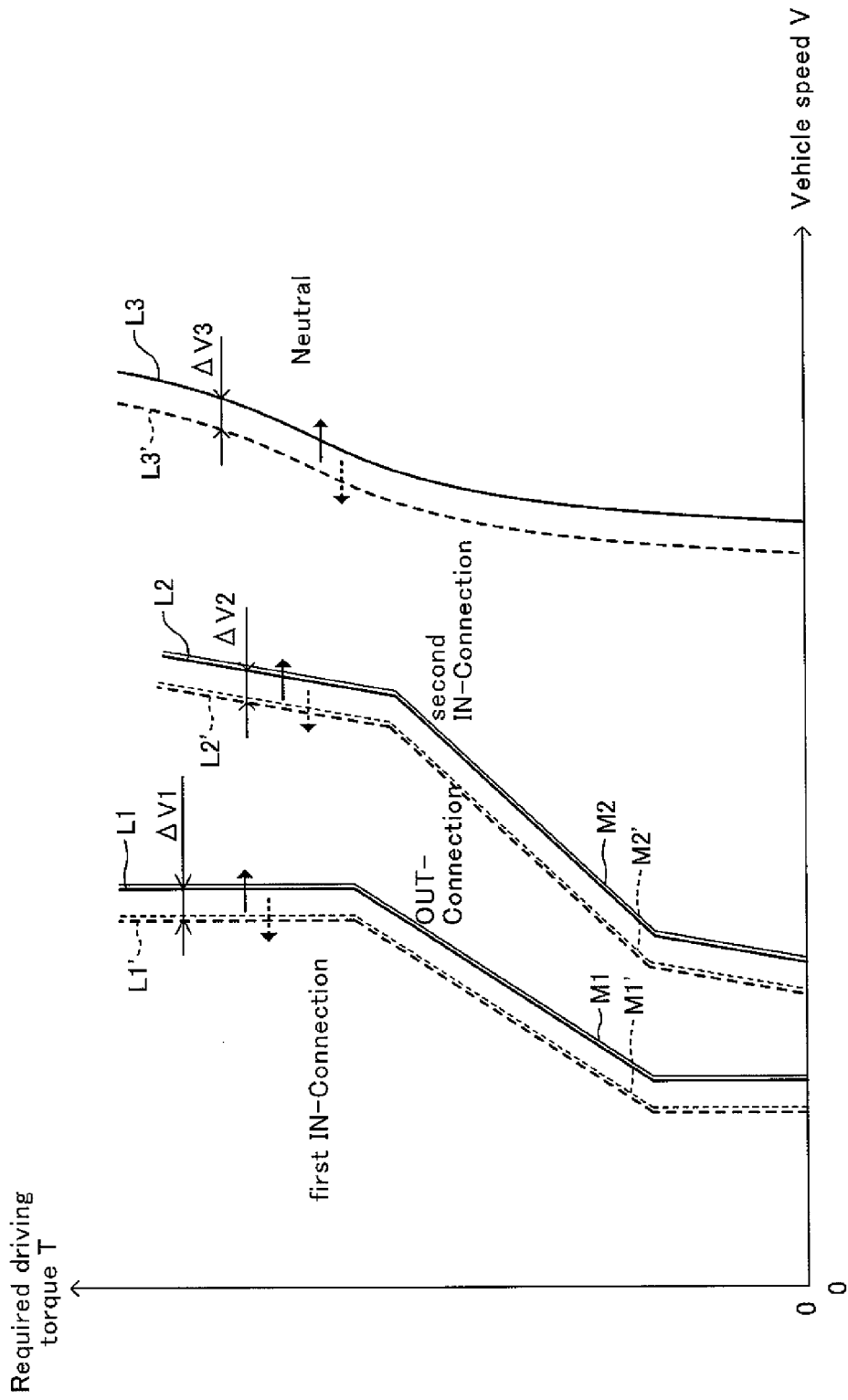
FIG. 10 is a graph showing a modified example of the map shown in FIG. 8.

Alternatively, a map shown in FIG. 10, in place of the map shown in FIG. 8, may be used for selecting/controlling the connection state of the output shaft A4 of the M/G 40. FIG. 10 is different from FIG. 8 only in that locations and shapes of the boundary lines L1, L1' and L2, L2' are different from those shown in FIG. 8. In FIG. 10, the boundary line L1 is set at a vehicle speed equal to the vehicle speed at which the shift up from the 1st gear position to the 2nd gear position is carried out. That is, the boundary lines L1 and L1' coincide with the boundary lines M1 and M1' shown in FIG. 7, respectively. Similarly, the boundary lines L2 is set at a vehicle speed equal to the vehicle speed at which the shift up from the 2nd gear position to the 3rd gear position is carried out. That is, the boundary lines L2 and L2' coincide with the boundary lines M2 and M2' shown in FIG. 7, respectively. Consequently, timings of the shift up and the shift down coincide with timings of the changeovers of the connection state of the output shaft A4 of the M/G 40, and the number of times "the vehicle receives a rapid change (shock) in the acceleration in the front-rear direction of the vehicle while the vehicle is driving" can be reduced.

Figure 11:
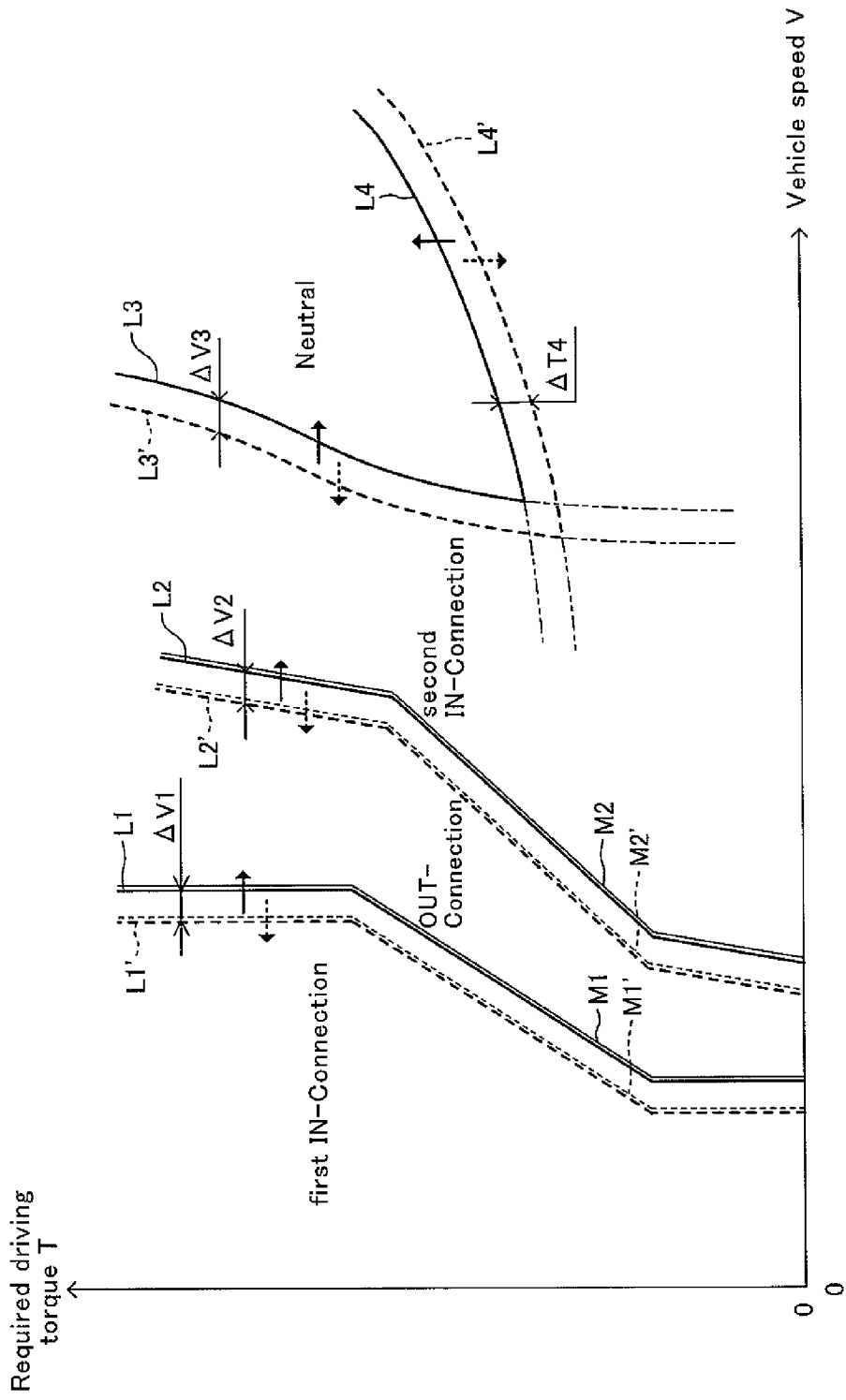
FIG. 11 is a graph showing a modified example of the map shown in FIG. 10.

Further, a map shown in FIG. 11, in place of the map shown in FIG. 10, may be used for selecting/controlling the connection state of the output shaft A4 of the M/G 40. FIG. 11 is different from FIG. 10 only in that the boundary lines L4 and L4' are added. That is, the difference between FIG. 11 and FIG. 10 is the same as the difference between FIG. 9 and FIG. 8. Accordingly, a detail description on FIG. 11 is therefore omitted.

Figure 12:
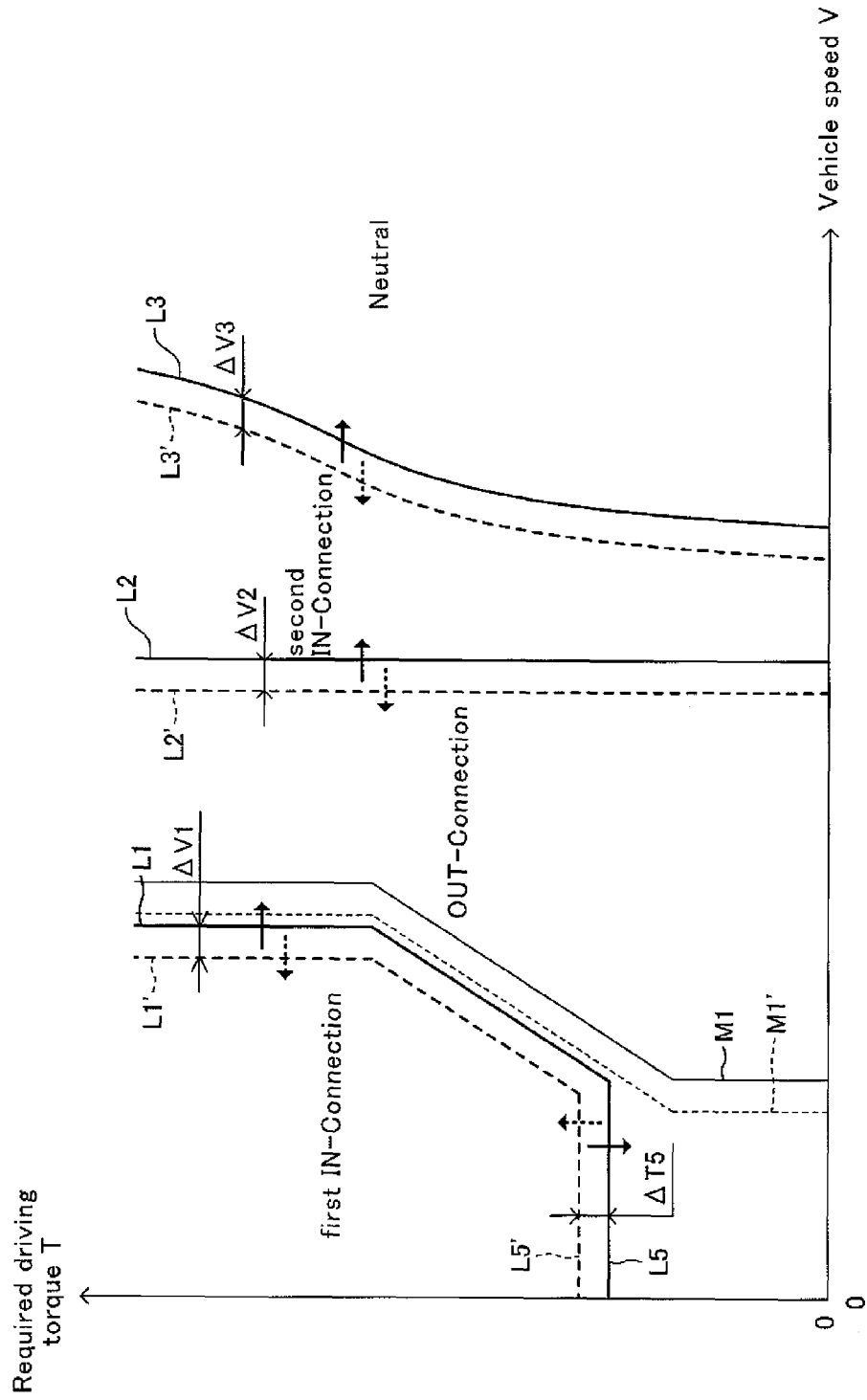
FIG. 12 is a graph showing a modified example of the map shown in FIG. 8.

Further, a map shown in FIG. 12, in place of the map shown in FIG. 8, may be used for selecting/controlling the connection state of the output shaft A4 of the M/G 40. FIG. 12 is different from FIG. 8 only in that the boundary lines L5 and L5' are added. Hereinafter, a description is made with focusing on the difference only. According to the map shown in FIG. 12, "the (first) IN-Connection State" is selected in a case in which the required driving torque T is larger than a value corresponding to the boundary line L5 when the vehicle starts to drive, similarly to the case in which the map shown in FIG. 8 is used. On the other hand, according to the map shown in FIG. 12, "the OUT-Connection State" is selected in a case in which the required driving torque T is smaller than the value corresponding to the boundary line L5 when the vehicle starts to drive, unlike the case in which the map shown in FIG. 8 is used.

The map shown in FIG. 12 is beneficial especially when the vehicle is running down on a descent. That is, in the present apparatus, a condition "the IN-connection reduction ratio Gin (=Gtm(1))>the OUT-connection reduction ratio Gout" is satisfied when the vehicle starts to drive. Accordingly, the driving torque, which is transmitted to the drive wheels and which is based on the output of the M/G 40, is larger when the vehicle starts to drive under the IN-Connection State, compared to the case in which the vehicle starts to drive under the OUT-Connection State. On the other hand, a large driving torque is not necessary when the vehicle starts to drive on a descent. Accordingly, especially in a case in which the required driving torque T is small when the vehicle is on the descent, a sufficient driving torque is obtained even when the vehicle starts to drive under the OUT-Connection State. In addition, the changeover of the connection state of the output shaft A4 of the M/G 40 is not carried out, until the vehicle speed V reaches the value corresponding to the boundary line L2, if the vehicle starts to drive under the OUT-Connection State. As a result, the number of times "the vehicle receives a rapid change (shock) in the acceleration in the front-rear direction of the vehicle while the vehicle is driving" can be reduced.

Figure 13:
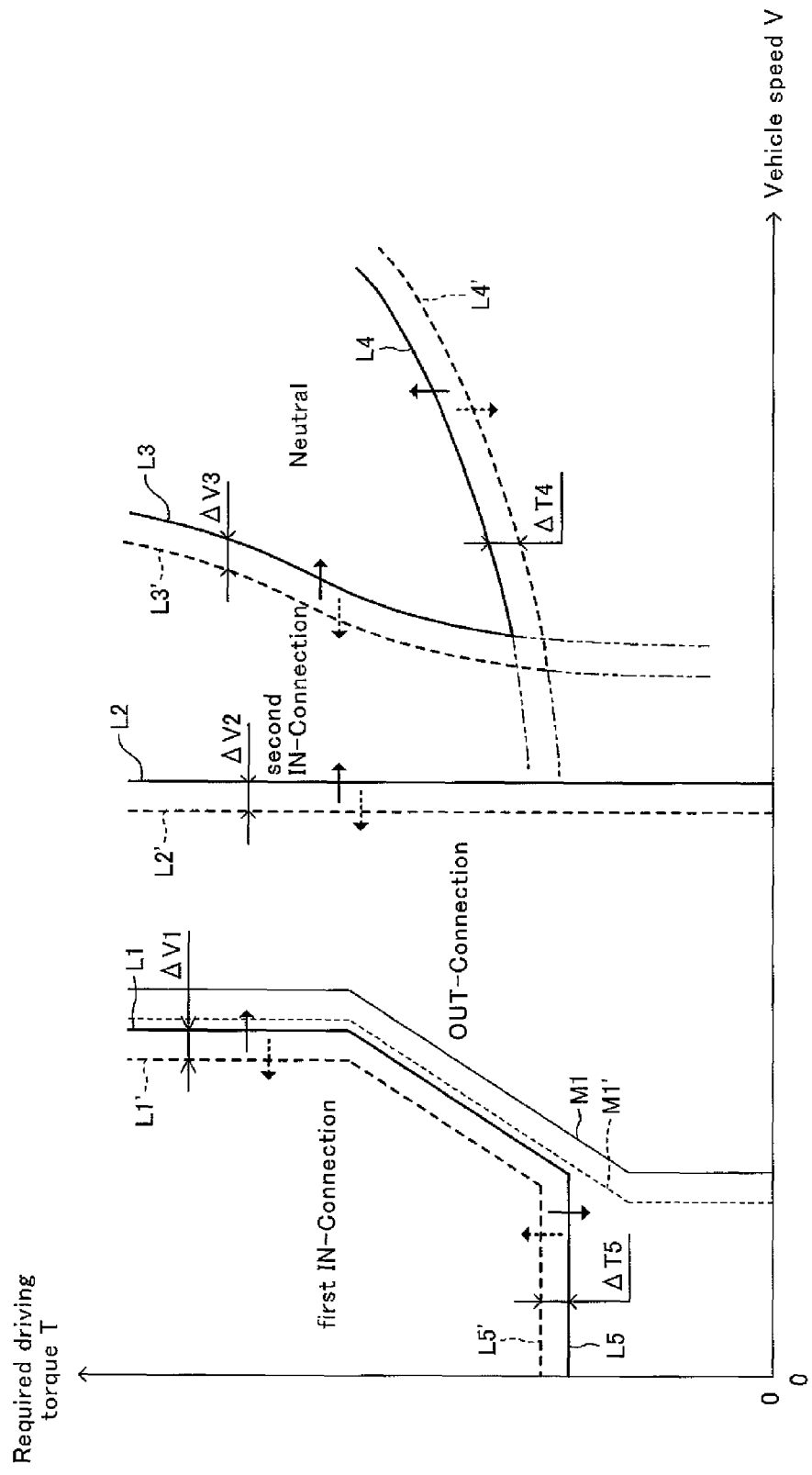
FIG. 13 is a graph showing a modified example of the map shown in FIG. 9.

Further, a map shown in FIG. 13, in place of the map shown in FIG. 9, may be used for selecting/controlling the connection state of the output shaft A4 of the M/G 40. FIG. 13 is different from FIG. 9 only in that the boundary lines L5 and L5' are added. That is, the difference between FIG. 13 and FIG. 9 is the same as the difference between FIG. 12 and FIG. 8. Accordingly, a detail description on FIG. 13 is therefore omitted.

Figure 14:
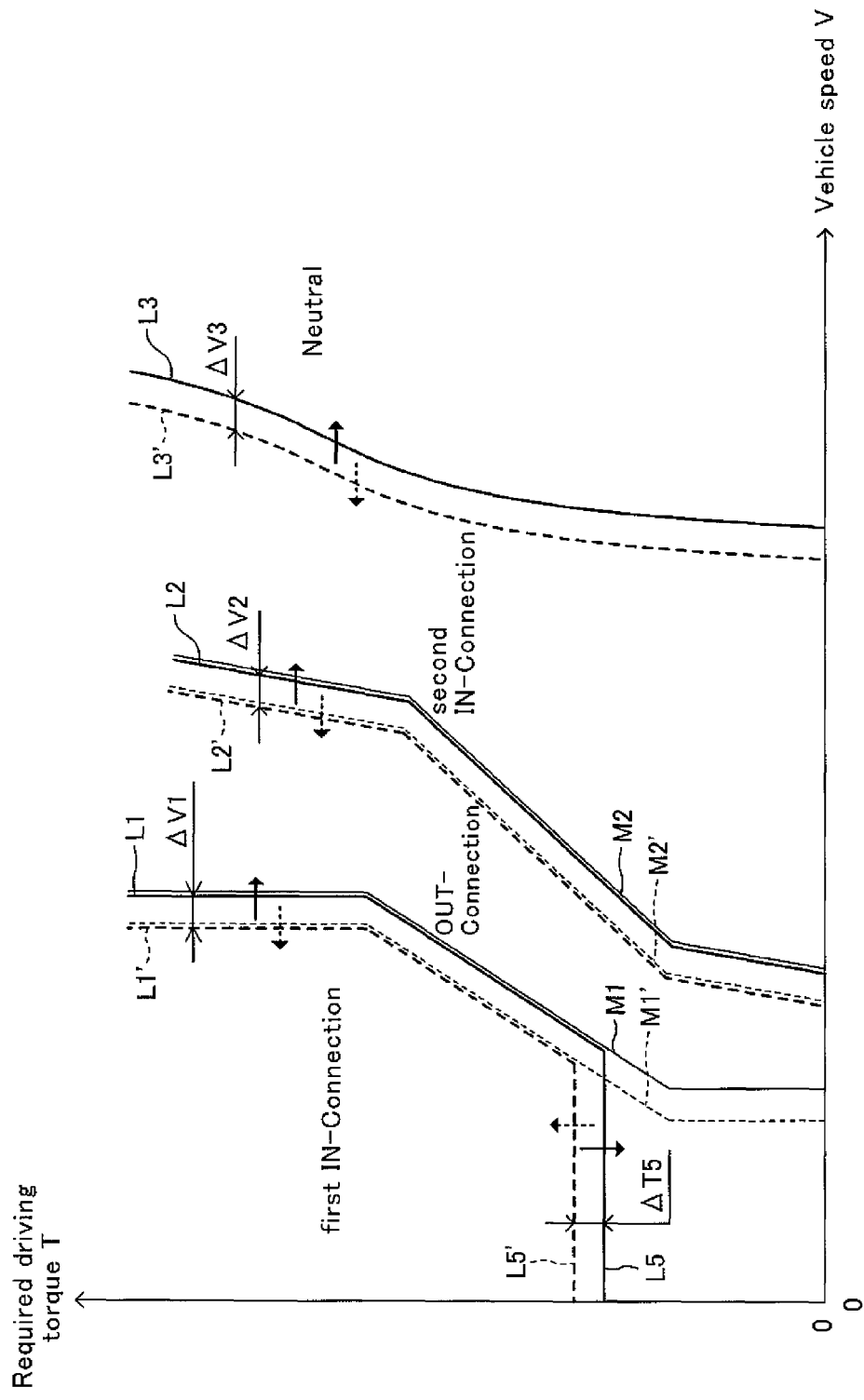
FIG. 14 is a graph showing a modified example of the map shown in FIG. 10.

Further, a map shown in FIG. 14, in place of the map shown in FIG. 10, may be used for selecting/controlling the connection state of the output shaft A4 of the M/G 40. FIG. 14 is different from FIG. 10 only in that the boundary lines L5 and L5' are added. That is, the difference between FIG. 14 and FIG. 10 is the same as the difference between FIG. 12 and FIG. 8. Accordingly, a detail description on FIG. 14 is therefore omitted.

Figure 15:
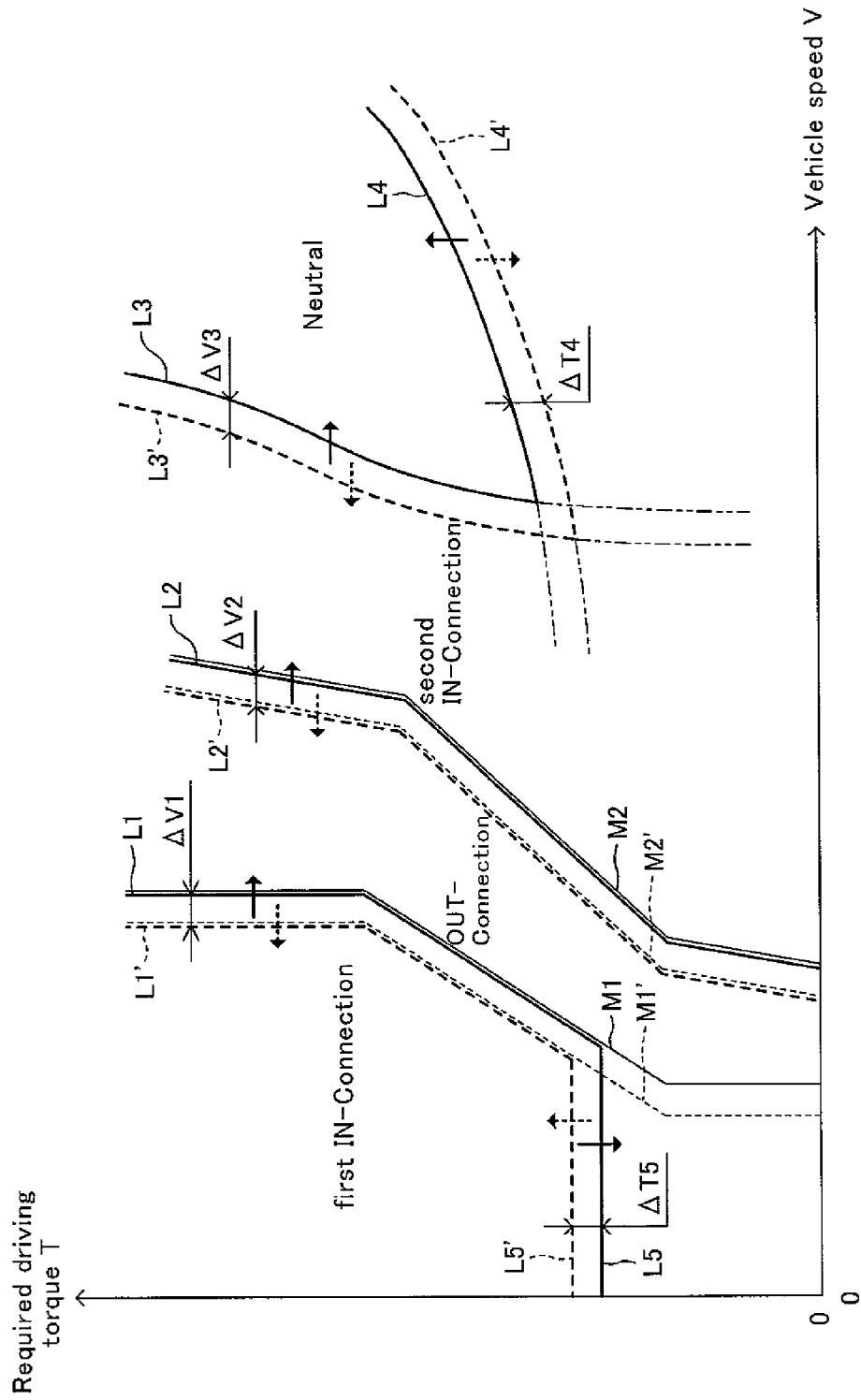
FIG. 15 is a graph showing a modified example of the map shown in FIG. 11.

Further, a map shown in FIG. 15, in place of the map shown in FIG. 11, may be used for selecting/controlling the connection state of the output shaft A4 of the M/G 40. FIG. 15 is different from FIG. 11 only in that the boundary lines L5 and L5" are added. That is, the difference between FIG. 15 and FIG. 11 is the same as the difference between FIG. 12 and FIG. 8. Accordingly, a detail description on FIG. 15 is therefore omitted.

Figure 16:
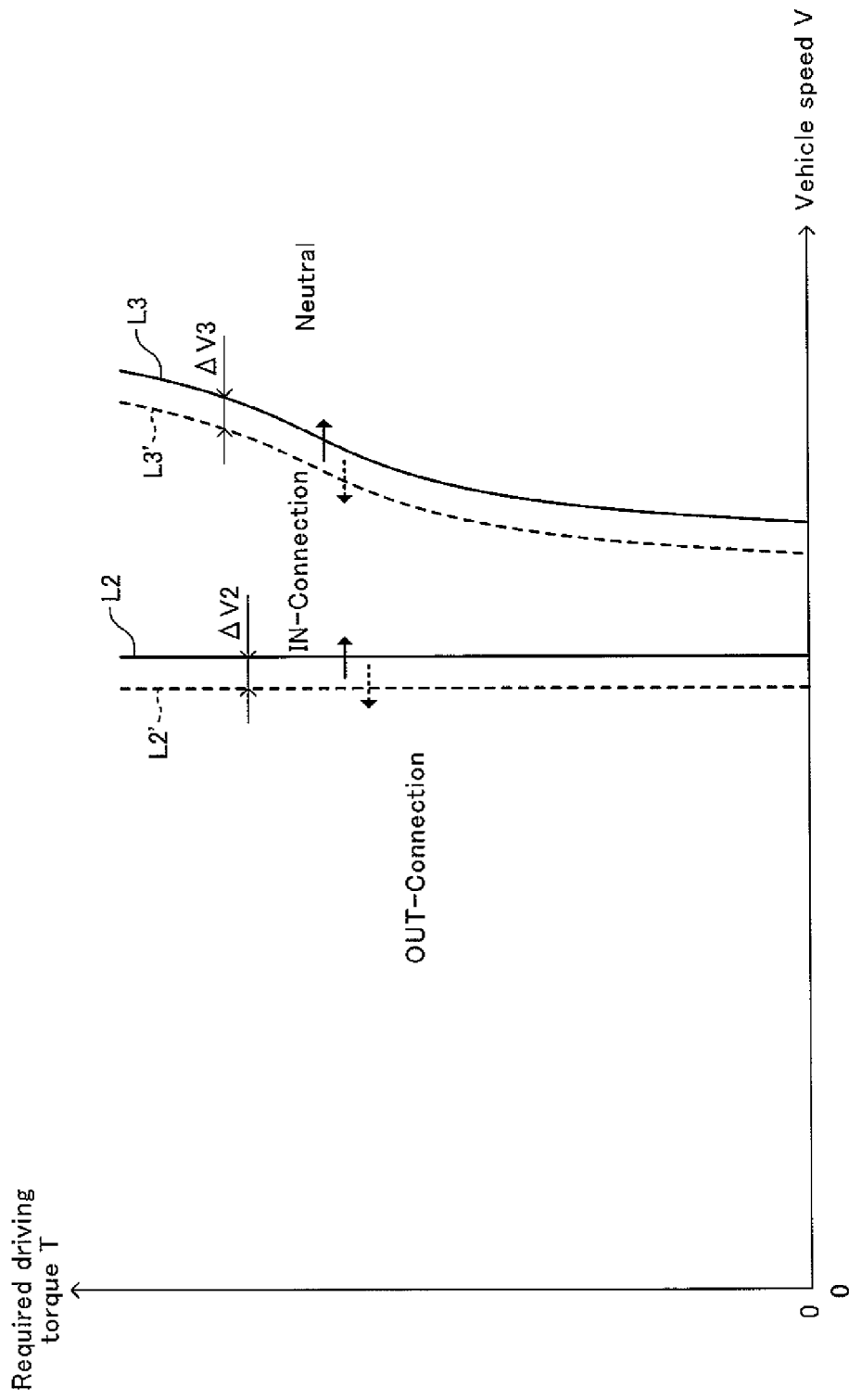
FIG. 16 is a graph showing a modified example of the map shown in FIG. 8.

Further, a map shown in FIG. 16, in place of the map shown in FIG. 8, may be used for selecting/controlling the connection state of the output shaft A4 of the M/G 40. FIG. 16 is different from FIG. 8 only in that the boundary lines L1 and L1' are omitted and the area which is the first IN-Connection area in FIG. 8 is united/merged into the OUT-Connection area. Hereinafter, a description is made with focusing on the difference only. According to the map shown in FIG. 16, "the OUT-Connection State" is always selected when the vehicle starts to drive, irrespective of a magnitude of the required driving torque T.

The map shown in FIG. 16 is beneficial especially when the vehicle is running down on a descent for the same reason with respect to the map shown in FIG. 12. It is beneficial for the map shown in FIG. 16 to be applied to a descent which is steeper than a descent which the map shown in FIG. 12 expects, especially because the OUT-Connection State is selected in a case in which the vehicle is on the descent even when the required driving torque T is large.

Figure 17:
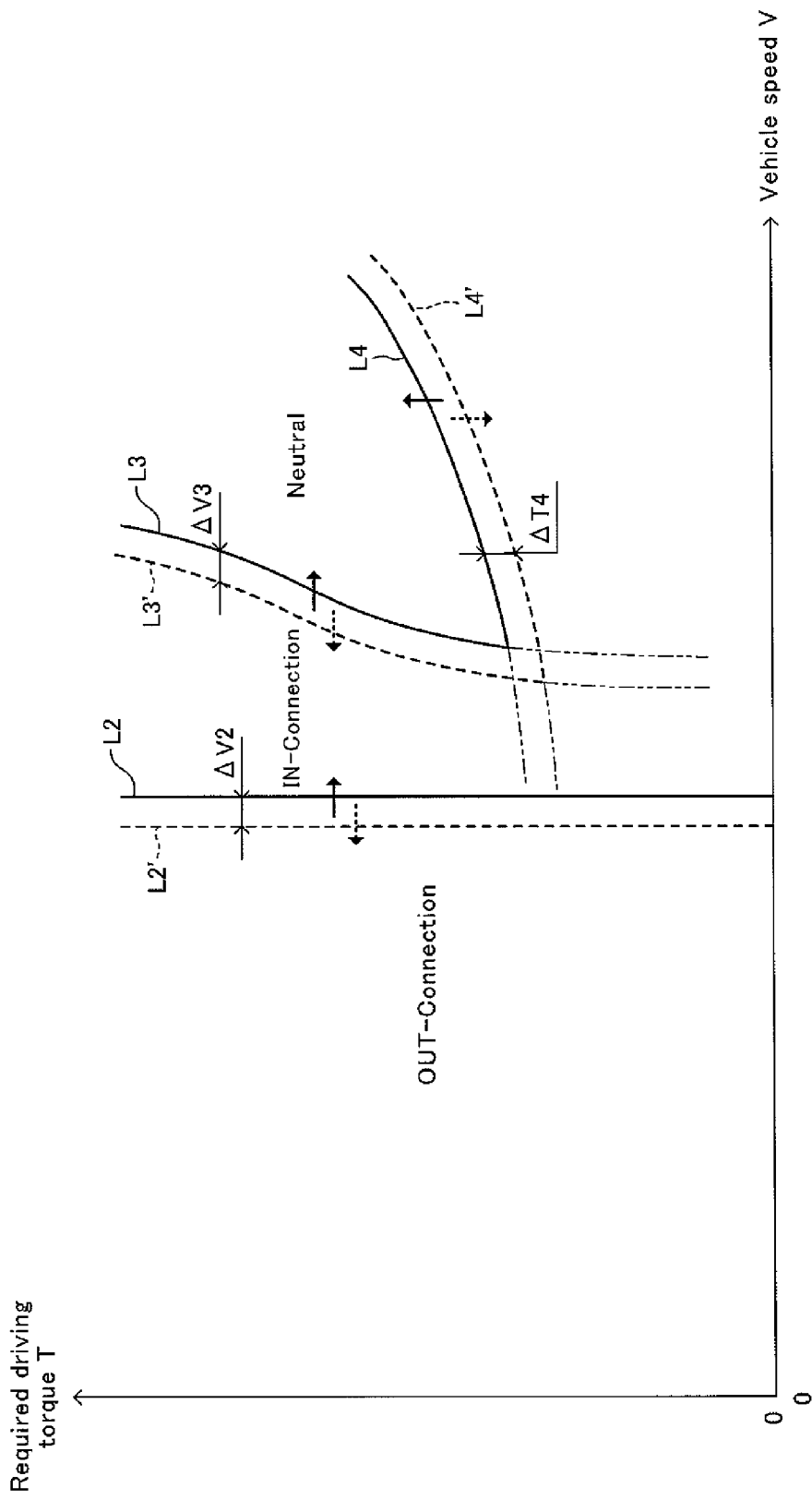
FIG. 17 is a graph showing a modified example of the map shown in FIG. 9.

Further, a map shown in FIG. 17, in place of the map shown in FIG. 9, may be used for selecting/controlling the connection state of the output shaft A4 of the M/G 40. FIG. 17 is different from FIG. 9 only in that the boundary lines L1 and L1' are omitted and the area which is the first IN-Connection area in FIG. 9 is united/merged into the OUT-Connection area. That is, the difference between FIG. 17 and FIG. 9 is the same as the difference between FIG. 16 and FIG. 8. Accordingly, a detail description on FIG. 17 is therefore omitted.

Figure 18:
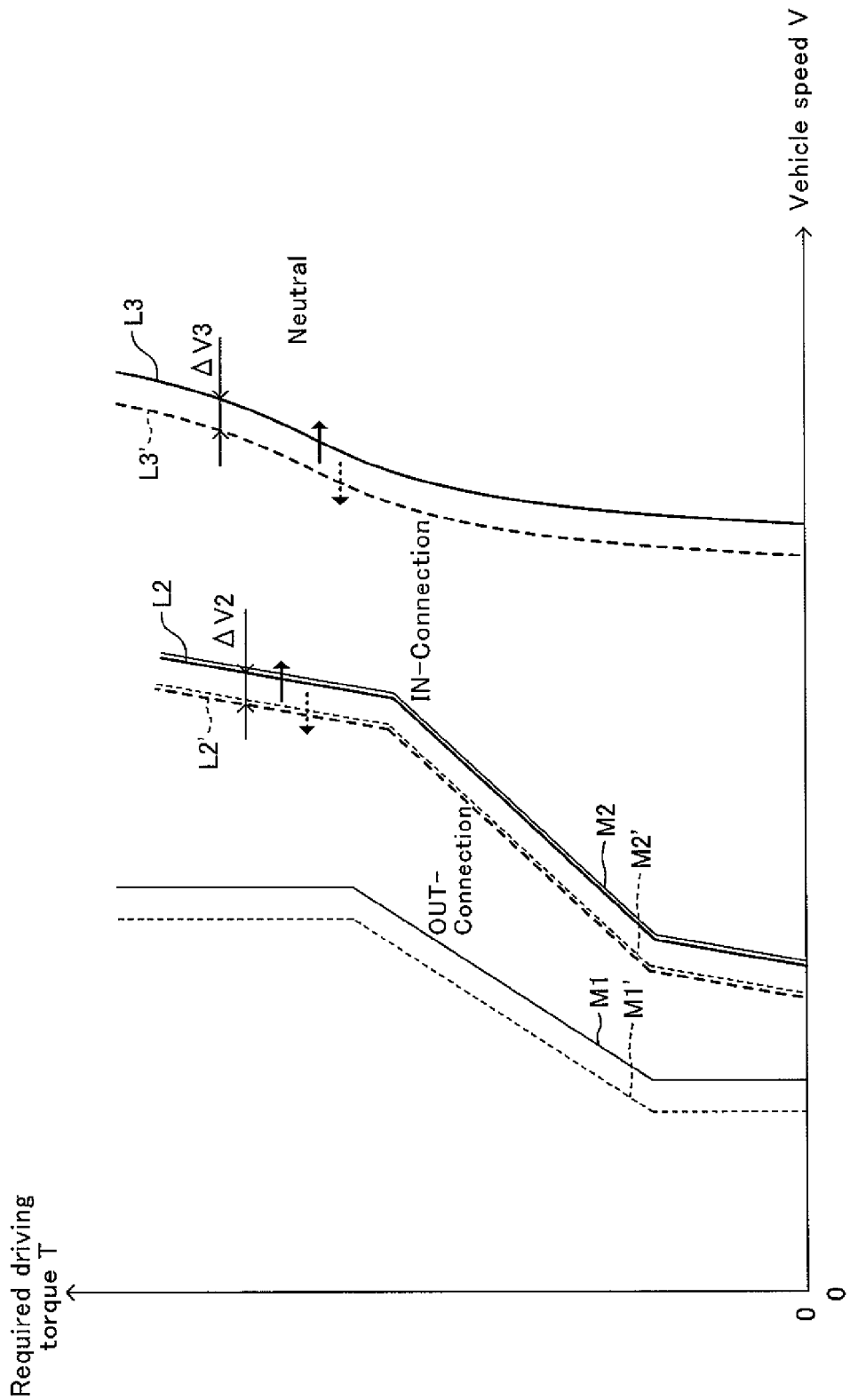
FIG. 18 is a graph showing a modified example of the map shown in FIG. 10.

Further, a map shown in FIG. 18, in place of the map shown in FIG. 10, may be used for selecting/controlling the connection state of the output shaft A4 of the M/G 40. FIG. 18 is different from FIG. 10 only in that the boundary lines L1 and L1' are omitted and the area which is the first IN-Connection area in FIG. 10 is united/merged into the OUT-Connection area. That is, the difference between FIG. 18 and FIG. 10 is the same as the difference between FIG. 16 and FIG. 8. Accordingly, a detail description on FIG. 18 is therefore omitted.

Figure 19:
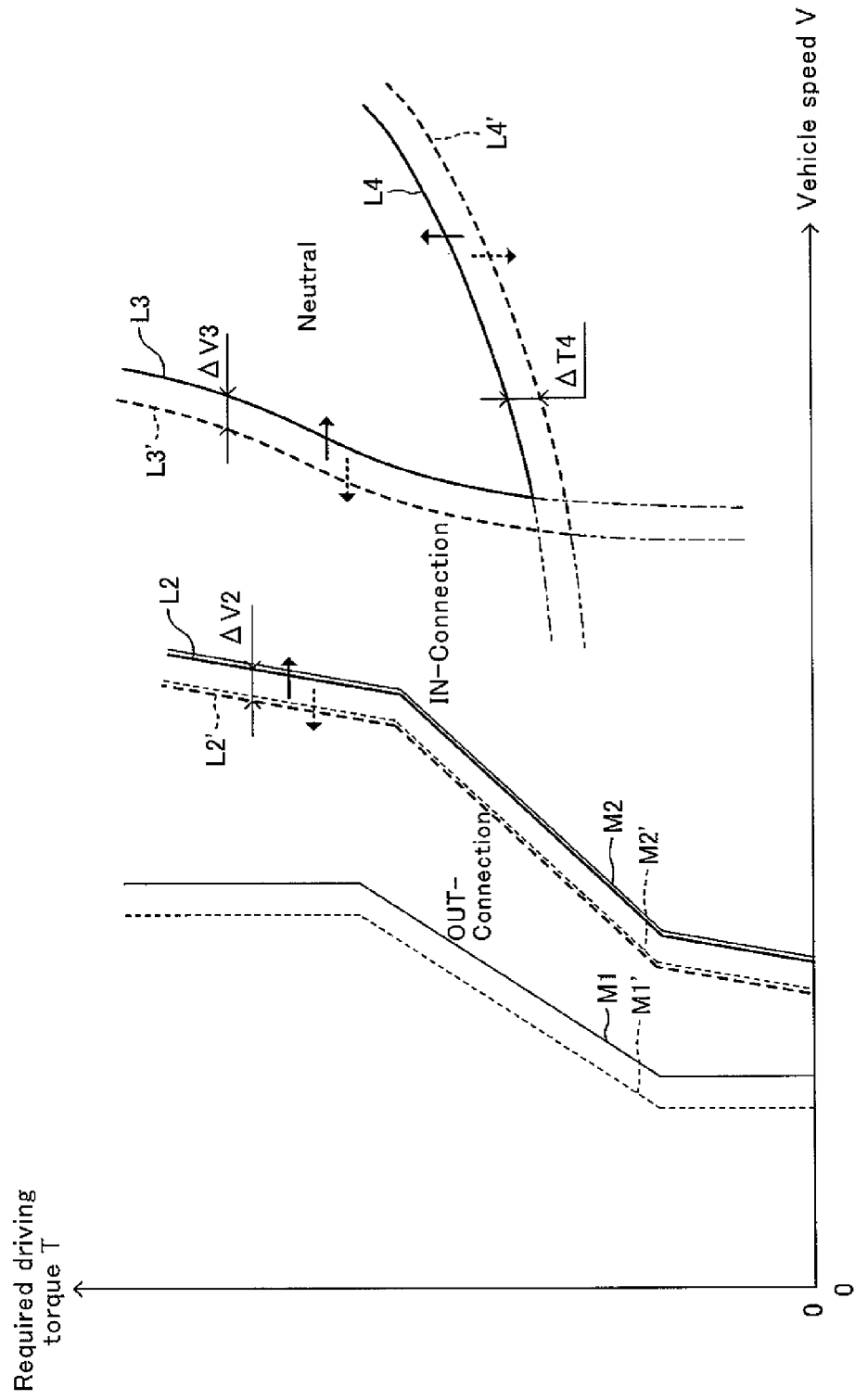
FIG. 19 is a graph showing a modified example of the map shown in FIG. 11.

Further, a map shown in FIG. 19, in place of the map shown in FIG. 11, may be used for selecting/controlling the connection state of the output shaft A4 of the M/G 40. FIG. 19 is different from FIG. 11 only in that the boundary lines L1 and L1' are omitted and the area which is the first IN-Connection area in FIG. 11 is united/merged into the OUT-Connection area. That is, the difference between FIG. 19 and FIG. 11 is the same as the difference between FIG. 16 and FIG. 8. Accordingly, a detail description on FIG. 19 is therefore omitted.

Figure 20:
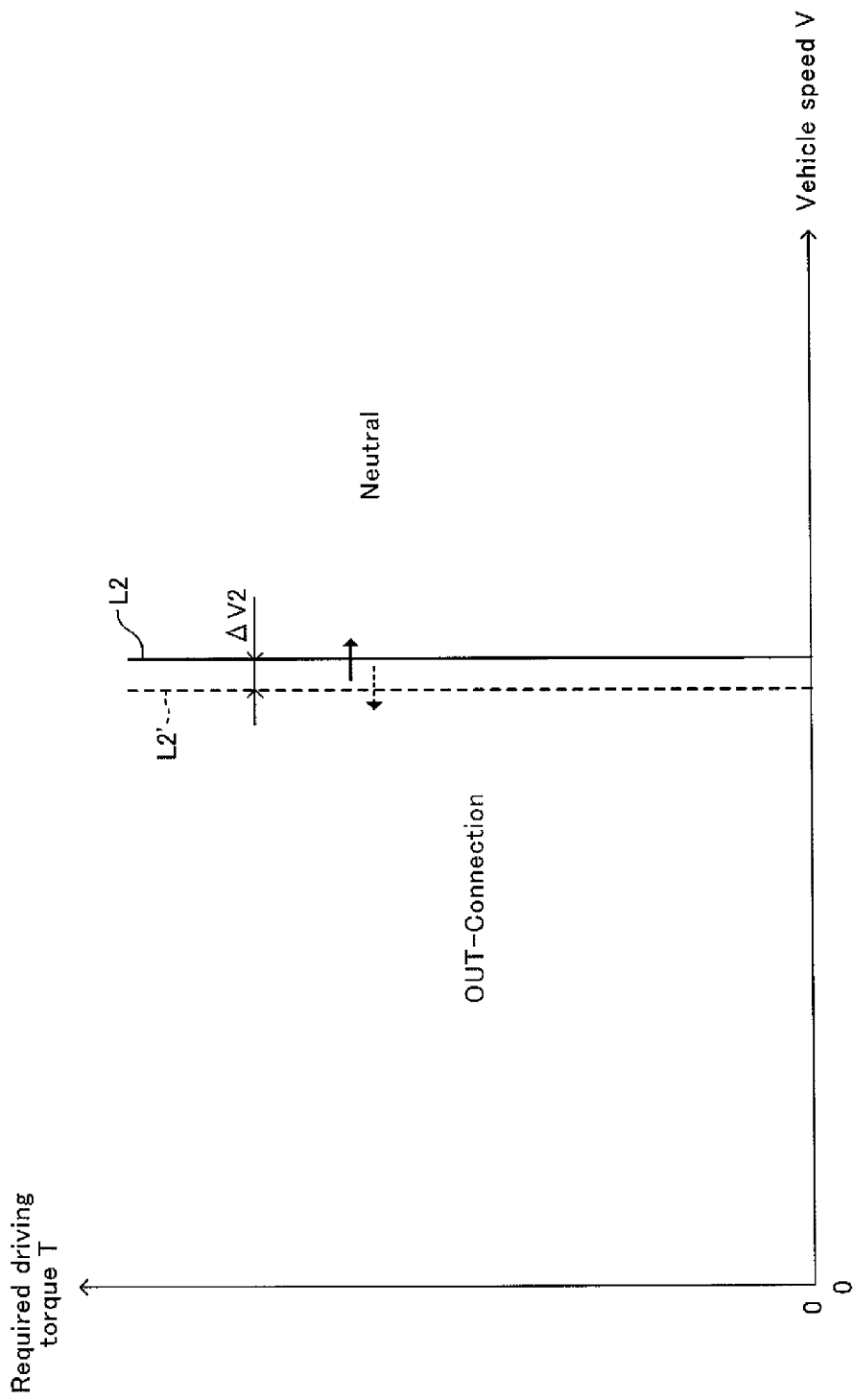
FIG. 20 is a graph showing a modified example of the map shown in FIG. 8.

Further, a map shown in FIG. 20, in place of the map shown in FIG. 8, may be used for selecting/controlling the connection state of the output shaft A4 of the M/G 40. FIG. 20 is different from FIG. 8 only in that the boundary lines L1, L1' and boundary lines L3, L3' are omitted, and the area which is the first IN-Connection area in FIG. 8 is united/merged into the OUT-Connection area, and the area which is the second IN-Connection area in FIG. 8 is united/merged into the neutral area.

Figure 21:
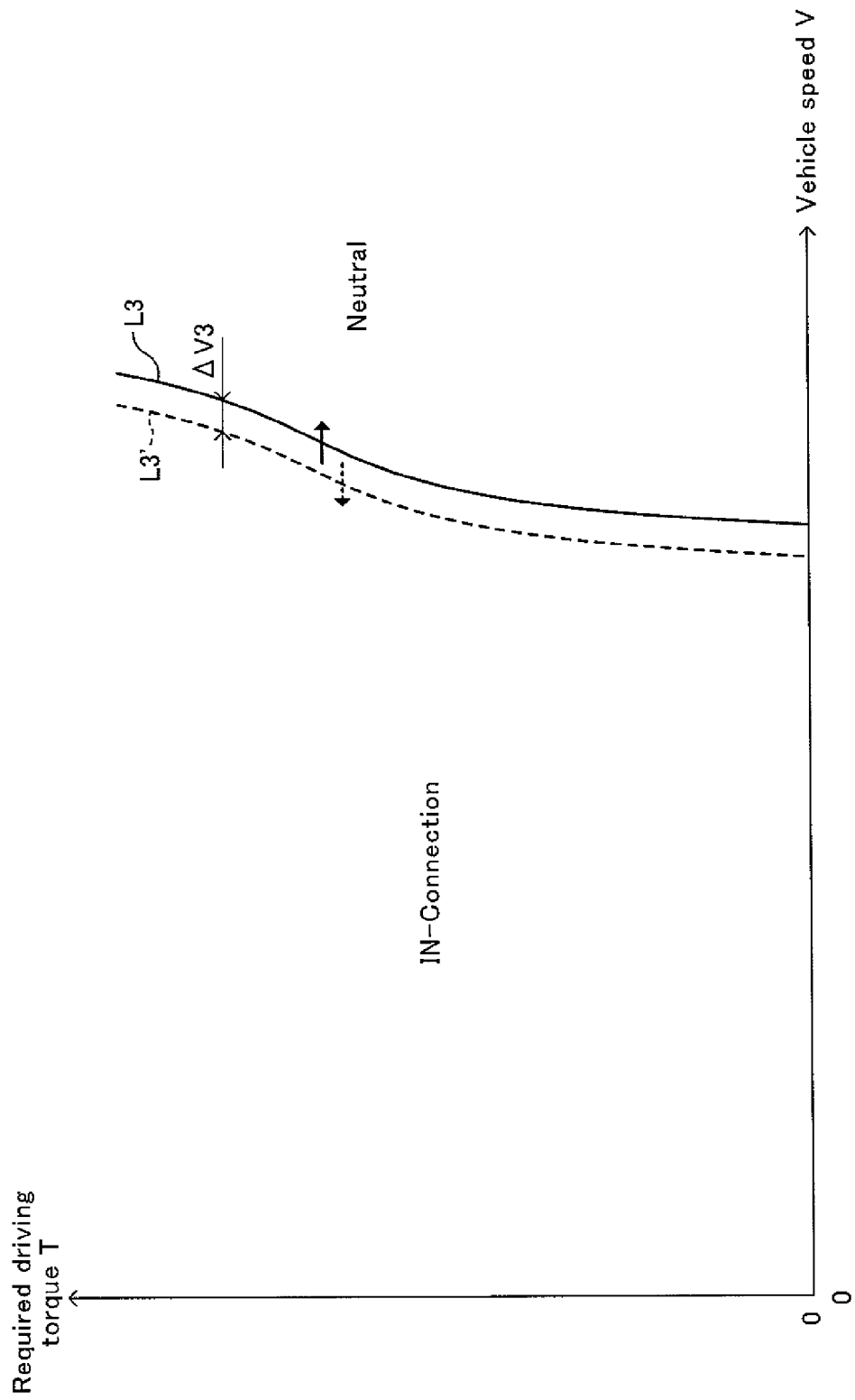
FIG. 21 is a graph showing a modified example of the map shown in FIG. 8.

Further, a map shown in FIG. 21, in place of the map shown in FIG. 8, may be used for selecting/controlling the connection state of the output shaft A4 of the M/G 40. FIG. 21 is different from FIG. 8 only in that the boundary lines L1, L1' and boundary lines L2, L2' are omitted, and the area which is the first IN-Connection area in FIG. 8, the area which is the second IN-Connection area in FIG. 8, and the area which is the OUT-Connection area in FIG. 8 are united/merged into a single IN-Connection area.

The map shown in FIG. 21 is beneficial especially when the vehicle is on an uphill (upward slope). That is, as described above, in the present example, the condition "the IN-connection reduction ratio Gin (=Gtm(1))>the OUT-connection reduction ratio Gout" is satisfied when the vehicle starts to drive. Accordingly, the large driving torque is obtained when the vehicle starts to drive under the IN-Connection State. Further, according to the map shown in FIG. 21, the changeover of the connection state of the output shaft A4 of the M/G 40 is not carried out until the vehicle speed V reaches the value corresponding to the boundary line L3. The driving torque based on the output of the M/G 40 is not transmitted to the drive wheels, during the changeover operation of the output shaft A4 of the M/G 40. On the upward slope, a decreasing rate in the vehicle speed is large when the torque transmitted to the drive wheels decreases. Accordingly, it is preferable to reduce the number of times of the changeover operation. When the map shown in FIG. 21 is applied, not only the large torque can be obtained when the vehicle starts to drive, but also the number of times of the changeover operation of the output shaft A4 of the M/G 40 when the vehicle speed is increasing becomes small. Accordingly, the map shown in FIG. 21 is beneficial especially when the vehicle is running on the uphill (upward slope).

Figure 22:
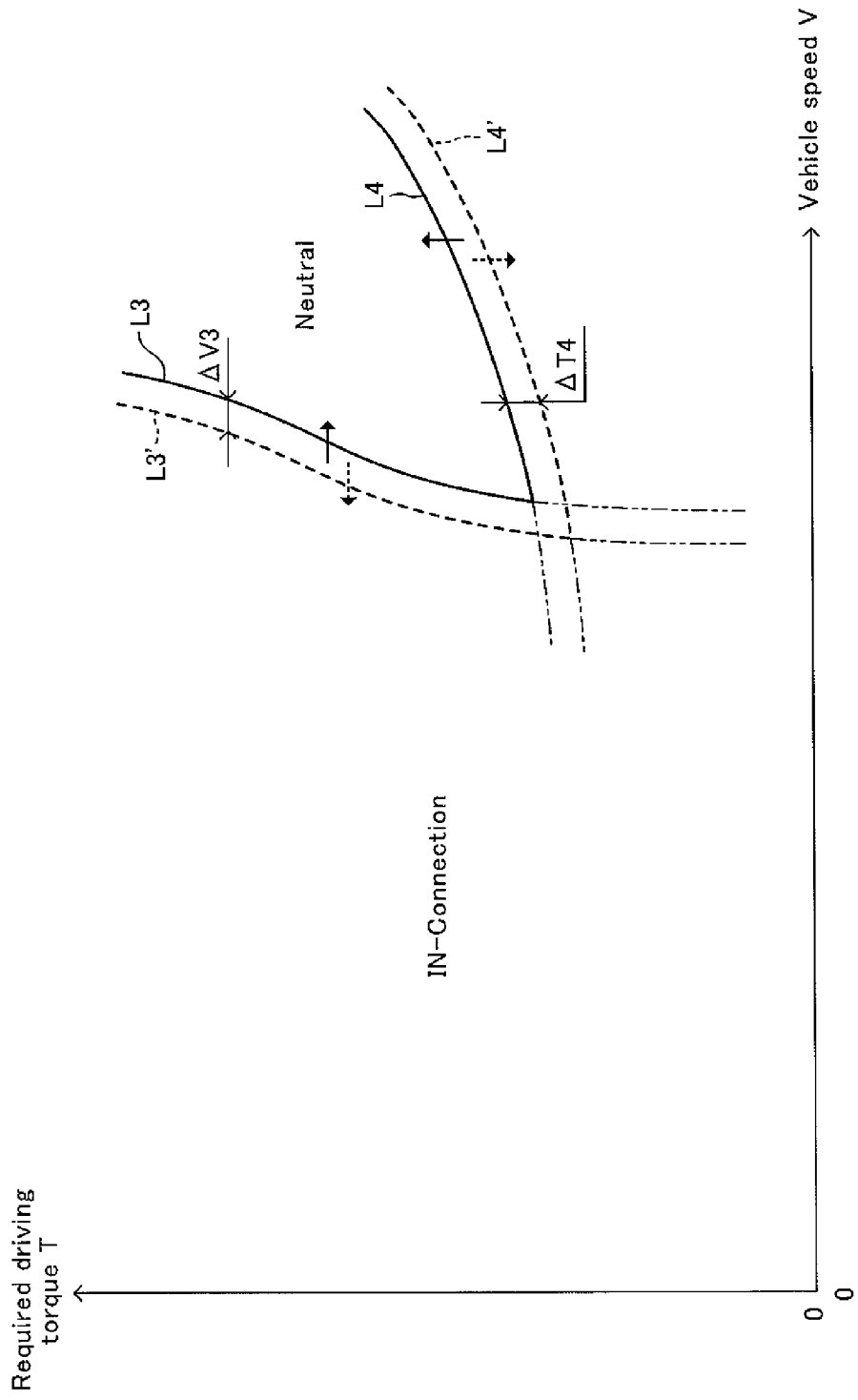
FIG. 22 is a graph showing a modified example of the map shown in FIG. 21.

Further, a map shown in FIG. 22, in place of the map shown in FIG. 21, may be used for selecting/controlling the connection state of the output shaft A4 of the M/G 40. FIG. 22 is different from FIG. 21 only in that the boundary lines L4 and L4' are added. That is, the difference between FIG. 22 and FIG. 21 is the same as the difference between FIG. 9 and FIG. 8.

Figure 23:
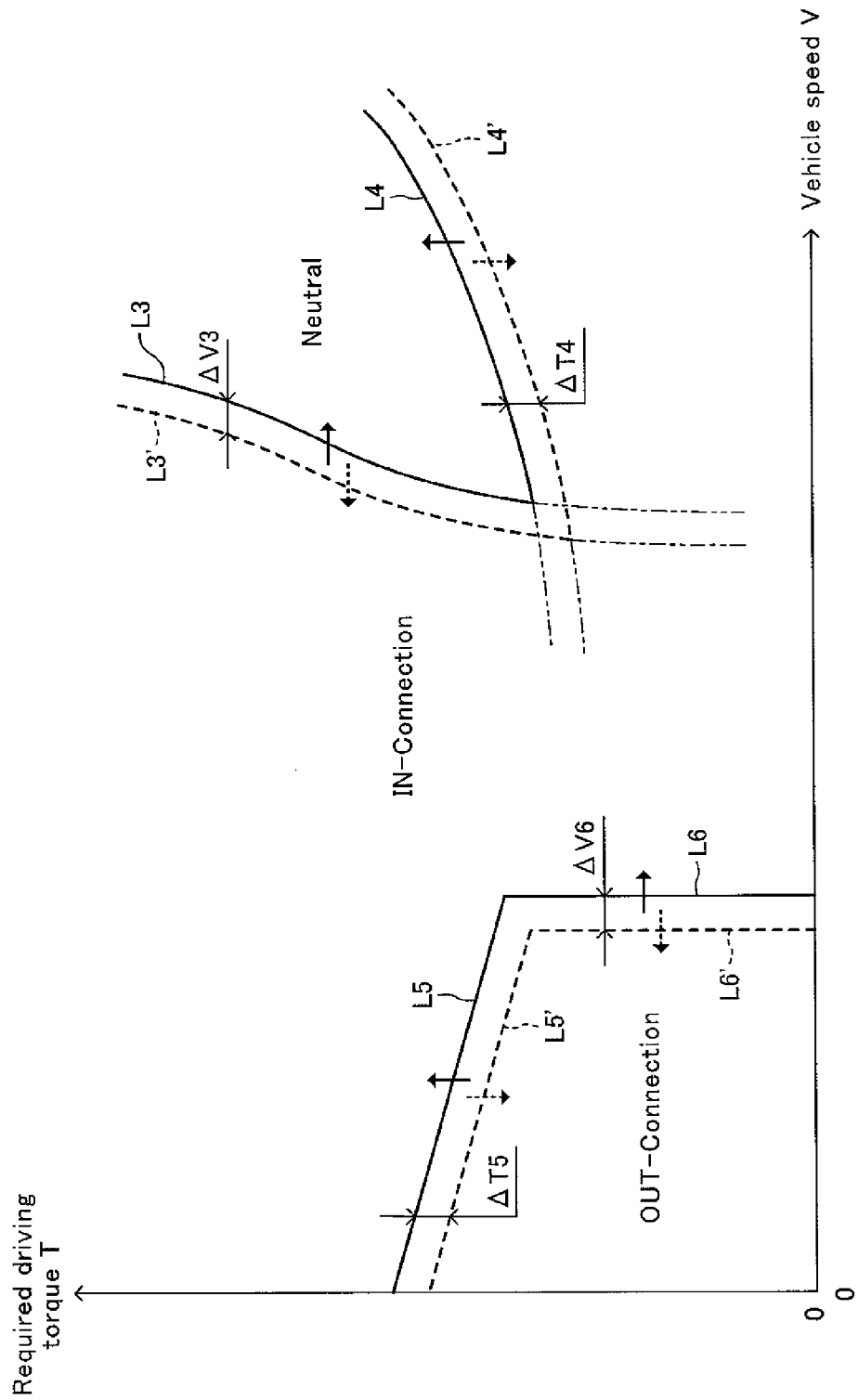
FIG. 23 is a graph showing a modified example of the map shown in FIG. 22.

Further, a map shown in FIG. 23, in place of the map shown in FIG. 22, may be used for selecting/controlling the connection state of the output shaft A4 of the M/G 40. FIG. 23 is different from FIG. 22 only in that the boundary lines L5, L5' and boundary lines L6, L6' are added. According to the map shown in FIG. 23, similarly to the case where the map shown in FIG. 22 is used, "the IN-Connection State" is selected in a case in which the required driving torque T is larger than a value corresponding to the boundary line L5 when the vehicle starts to drive. On the other hand, according to the map shown in FIG. 23, unlike the map shown in FIG. 22, "the OUT-Connection State" is selected in a case in which the required driving torque T is smaller than the value corresponding to the boundary line L5 when the vehicle starts to drive. Accordingly, the map shown in FIG. 23 is beneficial especially when the vehicle is running on a descent, for the reasons described with respect to the maps shown in FIGS. 12 and 16.

Figure 24:
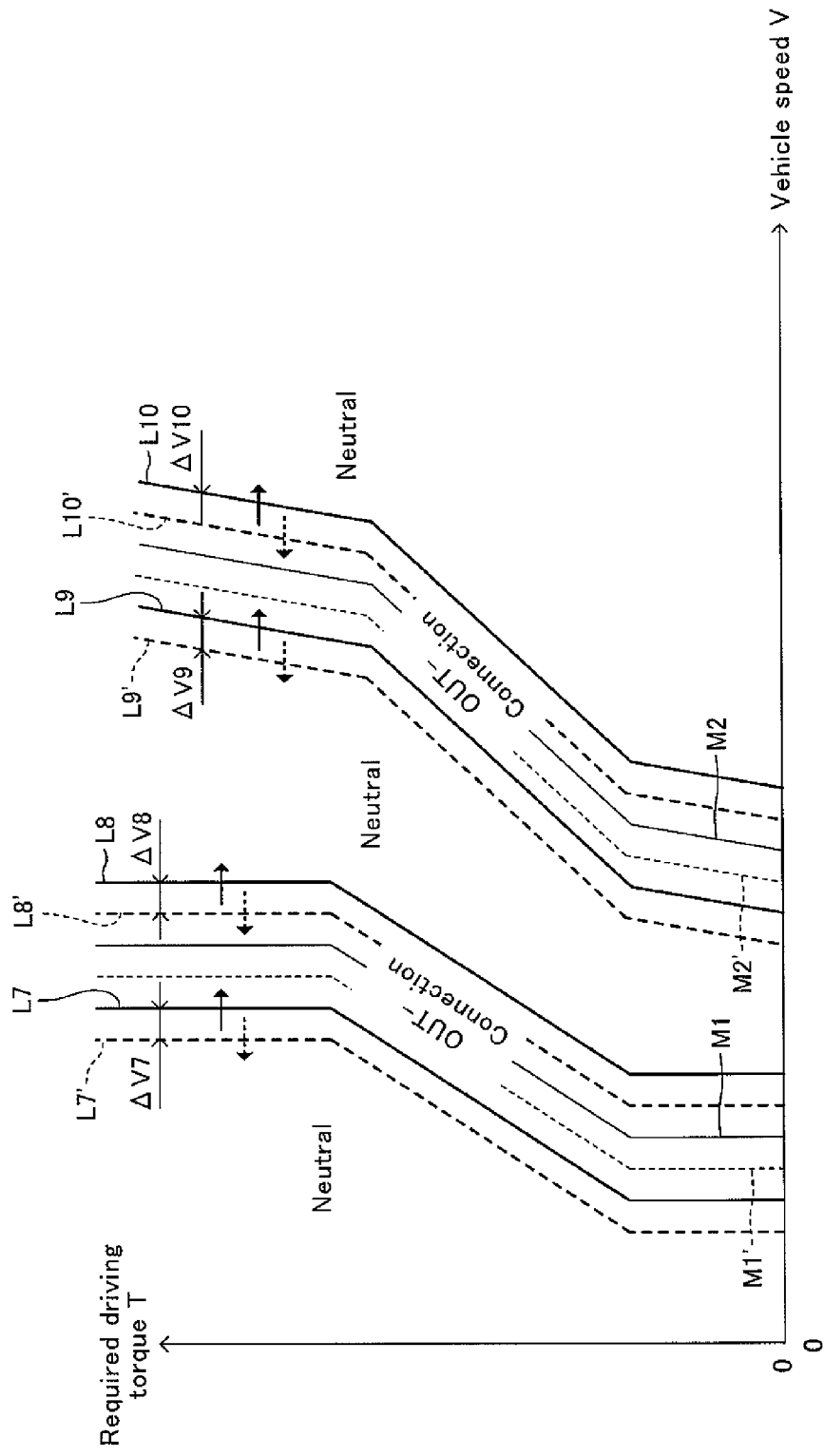
FIG. 24 is a graph showing a modified example of the map shown in FIG. 8.

Further, a map shown in FIG. 24 may be used for selecting/controlling the connection state of the output shaft A4 of the M/G 40. In FIG. 24, the boundary line L7 (or L8) is set at a vehicle speed slightly smaller (or larger) than the vehicle speed at which the shift up from the 1st gear position to the 2nd gear position is carried out. That is, the boundary lines L7 and L7' are set at locations to which the boundary lines M1 and M1' shown in FIG. 7 are slightly shifted in a direction (leftward direction in the Figure) along which the vehicle speed decreases, respectively. The boundary lines L8 and L8' are set at locations to which the boundary lines M1 and M1' shown in FIG. 7 are slightly shifted in a direction (rightward direction in the Figure) along which the vehicle speed increases, respectively.

Similarly, the boundary line L9 (or L10) is set at a vehicle speed slightly smaller (or larger) than the vehicle speed at which the shift up from the 2nd gear position to the 3rd gear position is carried out. That is, the boundary lines L9 and L9' are set at locations to which the boundary lines M2 and M2' shown in FIG. 7 are slightly shifted in a direction along which the vehicle speed decreases, respectively. The boundary lines L10 and L10' are set at locations to which the boundary lines M2 and M2' shown in FIG. 7 are slightly shifted in the direction along which the vehicle speed increases, respectively.

According to the map shown in FIG. 24, "the OUT-Connection State" is selected at the shift up timing and the shift down timing, and "the non-connection state" is selected at timings other than the shift up timing and the shift down timing. As described above, the shift shock due to the shift up and the shift down can be moderated in the OUT-Connection State. Accordingly, the map shown in FIG. 24 can moderate the shift shock due to the shift up and the shift down.

It should be noted that "the neutral area" in any one of maps shown in FIGS. 8 to 24 may be changed into "the IN-Connection State".

What is claimed is:

1. A vehicular power transmission control apparatus applied to a vehicle comprising an internal combustion engine and an electric motor as power sources, comprising:
   a transmission including an input shaft to provide a power transmission path between said input shaft of said transmission and an output shaft of said internal combustion engine, and an output shaft to provide a power transmission path between said output shaft of said transmission and drive wheels of said vehicle, wherein said transmission is capable of adjusting a transmission reduction ratio which is a ratio of a rotational speed of said input shaft of said transmission to a rotational speed of said output shaft of said transmission;
   a changeover mechanism which is capable of changing a connection state of an output shaft of said electric motor to any one from two or more states comprising,
      an input-side-connection state in which a power transmission path is provided between said output shaft of said electric motor and said input shaft of the transmission, an output-side-connection state in which a power transmission path is provided between said output shaft of said electric motor and said output shaft of said transmission without involving said transmission, and a non-connection state in which neither a power transmission path between said output shaft of said electric motor and said input shaft of said transmission, nor a power transmission path between said output shaft of said electric motor and said output shaft of said transmission is provided; and control means for selecting one of said connection states based on a parameter correlating with a vehicle speed and a parameter correlating with a required driving torque obtained based on an operation applied to an acceleration operating member by a driver of said vehicle, and for controlling said changeover mechanism in such a manner that an actual connection state of said output shaft of said electric motor coincides with said selected connection state.

2. A vehicular power transmission control apparatus according to claim 1, wherein said control means is configured so as to, select said input-side-connection state as said connection state of said output shaft of said electric motor, when said vehicle starts to drive, change said connection state of said output shaft of said electric motor from said input-side-connection state to said output-side-connection state, when said vehicle speed passes over a first threshold while said vehicle speed is increasing in a condition in which an output-side-connection reduction ratio is smaller than an input-side-connection reduction ratio, said output-side-connection reduction ratio being a ratio of a rotational speed of said output shaft of said electric motor to a rotational speed of said output shaft of said transmission under said output-side-connection state, said input-side-connection reduction ratio being a product of a first reduction ratio and said transmission reduction ratio, and said first reduction ratio being a ratio of said rotational speed of said output shaft of said electric motor to a rotational speed of said input shaft of said transmission under said input-side-connection state, and change said connection state of said output shaft of said electric motor from said output-side-connection state to said input-side-connection state, when said vehicle speed passes over a second threshold larger than said first threshold while said vehicle speed is increasing in a condition in which said input-side-connection reduction ratio is smaller than said output-side-connection reduction ratio.

3. A vehicular power transmission control apparatus according to claim 2, wherein said control means is configured so as to, change said connection state of said output shaft of said electric motor from said input-side-connection state to said output-side-connection state, when said vehicle speed passes over a value smaller than said second threshold by a first deviation while said vehicle speed is decreasing in a condition in which said input-side-connection reduction ratio is smaller than said output-side-connection reduction ratio, and change said connection state of said output shaft of said electric motor from said output-side-connection state to said input-side-connection state, when said vehicle speed passes over a value smaller than said first threshold by a second deviation while said vehicle speed is decreasing in a condition in which said output-side-connection reduction ratio is smaller than said input-side-connection reduction ratio.

4. A vehicular power transmission control apparatus according to claim 2, wherein said control means is configured so as to change said connection state of said output shaft of said electric motor from said input-side-connection state to said non-connection state, when said vehicle speed passes over a third threshold larger than said second threshold while said vehicle speed is increasing in a condition in which said input-side-connection reduction ratio is smaller than said output-side-connection reduction ratio.

5. A vehicular power transmission control apparatus according to claim 4, wherein said control means is configured so as to change said connection state of said output shaft of said electric motor from said non-connection state to said input-side-connection state, when said vehicle speed passes over a value smaller than said third threshold by a third deviation while said vehicle speed is decreasing in a condition in which said input-side-connection reduction ratio is smaller than said output-side-connection reduction ratio.

6. A vehicular power transmission control apparatus according to claim 1, comprising a clutch mechanism, disposed between said output shaft of said internal combustion engine and said input shaft of said transmission, for shutting and providing said power transmission path between said output shaft of said internal combustion engine and said input shaft of said transmission, and wherein, said transmission is a multiple gear ratio transmission which does not comprise a torque converter and which can realize each of a plurality of predetermined reduction ratios different from one another as said transmission reduction ratio, and said control means is configured so as to control, based on a driving condition of said vehicle, shutting and providing of said power transmission path by said clutch mechanism, and so as to control said transmission reduction ratio.

7. A vehicular power transmission control apparatus according to claim 1, wherein said control means uses:

as said parameter correlating with said vehicle speed, any one of said vehicle speed itself, said rotational speed of said input shaft of said transmission, said rotational speed of said output shaft of said internal combustion engine, and said rotational speed of said output shaft of said electric motor; and as said parameter correlating with said required driving torque, either one of an operating amount of said acceleration operating member and an opening degree of a throttle valve disposed in an intake passage of said internal combustion engine.

* * * * *